(12) United States Patent
Apostolopoulos et al.

(10) Patent No.: US 7,200,402 B2
(45) Date of Patent: *Apr. 3, 2007

(54) METHOD FOR HANDING OFF STREAMING MEDIA SESSIONS BETWEEN WIRELESS BASE STATIONS IN A MOBILE STREAMING MEDIA SYSTEM

(75) Inventors: John G. Apostolopoulos, San Carlos, CA (US); Sujoy Basu, Mountain View, CA (US); Gene Cheung, Tokyo (JP); Rajendra Kumar, Los Altos, CA (US); Sumit Roy, Menlo Park, CA (US); Wai-tan Tan, Mountain View, CA (US); Susie J. Wee, San Carlos, CA (US); Tina Wong, Sunnyvale, CA (US); Bo Shen, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 962 days.

This patent is subject to a terminal disclaimer.

(21) Appl. No.: 09/898,572

(22) Filed: Jul. 3, 2001

(65) Prior Publication Data

US 2003/0009576 A1    Jan. 9, 2003

(51) Int. Cl.
*H04Q 7/20* (2006.01)

(52) U.S. Cl. ............... 455/442; 455/67.11; 455/115.3; 455/226.2

(58) Field of Classification Search ............... 455/436, 455/437, 438, 441, 442; 370/331, 332, 333, 370/334

See application file for complete search history.

(56) References Cited

U.S. PATENT DOCUMENTS 6,018,662 A    1/2000    Periyalwar et al.

(Continued)

FOREIGN PATENT DOCUMENTS

| EP | 0856956 | 8/1998 |
|---|---|---|
| EP | 0915598 | 5/1999 |

OTHER PUBLICATIONS

Shih-Ming Yang et al—"Low-Delay Communication for Rayleigh Fading Channels: An Application of the Multiple Description Quantizer"—IEEE Transactions on Communications vol. 43 No. 11—Nov. 1, 1995—pp. 2771-2783.

*Primary Examiner*—Temica Beamer

(57) ABSTRACT

A method for performing a soft-handoff in a mobile streaming media system, and a method for performing a hard-handoff in a mobile streaming media system are is disclosed. In the soft-handoff embodiment, the present invention detects that a channel quality between a mobile client and a first base station remains above a drop threshold and that a channel quality between the mobile client and a second base station increases from below to above an add threshold. The present embodiment then sends a first multiple description bitstream from the first base station to the mobile client and sends a complementary second multiple description bitstream from the second base station to the mobile client. This method thereby provides improved utilization of wireless bandwidth during soft-handoffs, in contrast to conventional systems where the same bitstream is transmitted from each base station. In both the cases of soft-handoffs and hard-handoffs, when a mobile client enters a cell whose base station has no free capacity, the base station may prevent call dropping by reducing the number of descriptions being served to the existing clients and thereby providing capacity (at least one description) for the new client. These methods provide improved utilization of wireless bandwidth during soft-handoffs, and reduced probability of service disruption during both soft-handoffs and hard-handoffs.

10 Claims, 18 Drawing Sheets

U.S. PATENT DOCUMENTS

| | | |
|---|---|---|
| 6,253,185 B1 | 6/2001 | Arean et al. |
| 6,381,458 B1 * | 4/2002 | Frodigh et al. ............. 455/442 |
| 6,996,618 B2 * | 2/2006 | Apostolopoulos et al. .. 709/227 |
| 2001/0034233 A1 * | 10/2001 | Tiedermann et al. ....... 455/436 |
| 2002/0191561 A1 * | 12/2002 | Chen et al. ................. 370/331 |
| 2002/0193114 A1 * | 12/2002 | Agrawal et al. ............ 455/442 |

* cited by examiner

METHOD FOR HANDING OFF STREAMING MEDIA SESSIONS BETWEEN WIRELESS BASE STATIONS IN A MOBILE STREAMING MEDIA SYSTEM

TECHNICAL FIELD

The present claimed invention relates to the field of streaming media. More specifically, the present claimed invention relates to delivering streaming data to fixed clients and/or mobile clients using multiple description bitstreams and various forms of diversity.

BACKGROUND ART

Today's networks, such as the Internet, are primarily designed for delivering static, non-real-time data to fixed clients such as desktop computers and laptops. Developing a system that delivers real-time streaming media to mobile clients presents an even greater series of challenges due to the streaming nature of the data and the mobility of the user. These challenges are intensified when considering issues such as system scalability, which extends service to a larger number of users; and quality-of-service and fault tolerance, which provides mobile users with continuous, uninterrupted streaming media sessions. Furthermore, this robust, uninterrupted media delivery session must be delivered over best-effort networks, which provide best effort, but non-guaranteed levels of service. A solution that overcomes these many challenges requires innovation throughout the end-to-end system.

Currently, multimedia applications such as video and audio communication over the Internet or wireless links are hampered by the limited bandwidth and losses (e.g. packet loss or bit errors) that afflict these error-prone environments. These multimedia applications require high compression and high error resilience, however simultaneously achieving these qualities is difficult because these are largely conflicting requirements.

Two important characteristics of a media communication system are reliability and efficiency. For the problem of streaming media from a wired infrastructure to a wireless mobile client, a sequence of operations is performed where each is a possible point of failure. The conventional approach to achieve reliability in such a system is by duplicating resources, e.g. "mirrored servers" or transmitting the same information twice. This approach can reduce the probability of certain failures by providing backups, however it is inefficient as it requires twice as many resources and is still susceptible to other single points of failure.

The following is a more specific example of a conventional approach to streaming media from a wired infrastructure to a wireless mobile client, and the problems associated therewith. Streaming media from a wired infrastructure to a mobile client involves operation of a sequence of modules. If all of these modules work properly, then the communication is successful. However, if any of these modules is faulty, then the entire communication is unsuccessful. For example, a typical communication may involve a server reading a media stream from storage, sending it over a wired network to a wireless base station, the wireless base station then transmits the stream over the wireless channel to the wireless client. This system involves the interaction of at least the following modules (1) storage, (2) server, (3) wired network, (4) wireless base station, (5) wireless transmission in wireless cells. If all of the modules work properly then the communication is successful, however if any module is faulty the communication is unsuccessful. In an effort to improve reliability system designers typically add redundancy to remove single point of failure. For example, two sets of any hardware may be used instead of one, e.g. two storage modules or two servers, which are "mirrored" to contain the same information. Similarly, the same information may be transmitted twice in the wired network. In addition, the wireless transmission, assuming CDMA and soft-handoff, typically involves two or more transmissions of the same information. In each of these conventional approaches, the improved reliability is achieved by duplicating the information and/or the resources.

While these conventional methods of duplication improve reliability, they are also inefficient because they use twice as many resources. In addition, this conventional approach may be ineffective if a single fault may afflict both duplicates. For example, if both storage modules (and/or both servers) are at the same location, a power outage or flood would render both of them useless. When the same information is transmitted twice in a wired network, the information typically proceeds along the same path in the network. Therefore, if that same path is congested or experiences an outage, then both duplicates of the information would be lost. To summarize, in an attempt to improve reliability the conventional approach is to duplicate information and resources. This conventional approach is inefficient because of the duplication, and is also ineffective because in many cases there can still exist single points of failure.

Although portions of the above-listed discussion specifically mention the shortcomings of prior art approaches with respect to the streaming of video data for simplified presentation, such shortcomings are not limited solely to the streaming of video data. Instead, the problems of the prior art span various types of media including, but not limited to, audio-based data, speech-based data, image-based data, graphic data, web page-based data, and the like. Moreover, streaming media typically shares the property that the media streams must be delivered with a relative time constraint and thus share the notion of a stream.

Thus, the need has arisen for a method and system for streaming media to fixed clients and/or mobile clients. A further need exists for a method and system for streaming media to fixed clients and/or mobile clients wherein the method and system provides increased reliability and efficiency over conventional systems.

DISCLOSURE OF THE INVENTION

The present invention provides a method and system for streaming media to fixed clients and/or mobile clients. The present invention further provides a method and system for streaming media to fixed clients and/or mobile clients wherein the method and system provides increased reliability and efficiency over conventional systems.

Specifically, in several embodiments, the present invention provides a method for performing a soft-handoff in a mobile streaming media system, and a method for performing a hard-handoff in a mobile streaming media system. In the soft-handoff embodiment, the present invention detects that a channel quality between a mobile client and a first base station remains above a drop and add threshold and that a channel quality between the mobile client and a second base station decreases and increases from below to above an add threshold, respectively. The present embodiment then sends a first multiple description bitstream from the first base station to the mobile client and sends a second multiple description bitstream from the second base station to the mobile client. In the hard-handoff embodiment, the present invention detects that a mobile client enters the service region of a base station. The present embodiment then sends one or more multiple description bitstreams to the mobile client by either using available channel resources or by making channel resources available through reducing the number of multiple description bitstreams sent to other existing mobile clients.

These and other technical advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

PRIOR ART

The drawings referred to in this description should be understood as not being drawn to scale except if specifically noted.

BEST MODES FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "encoding", "transmitting", "storing", "distributing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INVENTION

Figure 1:
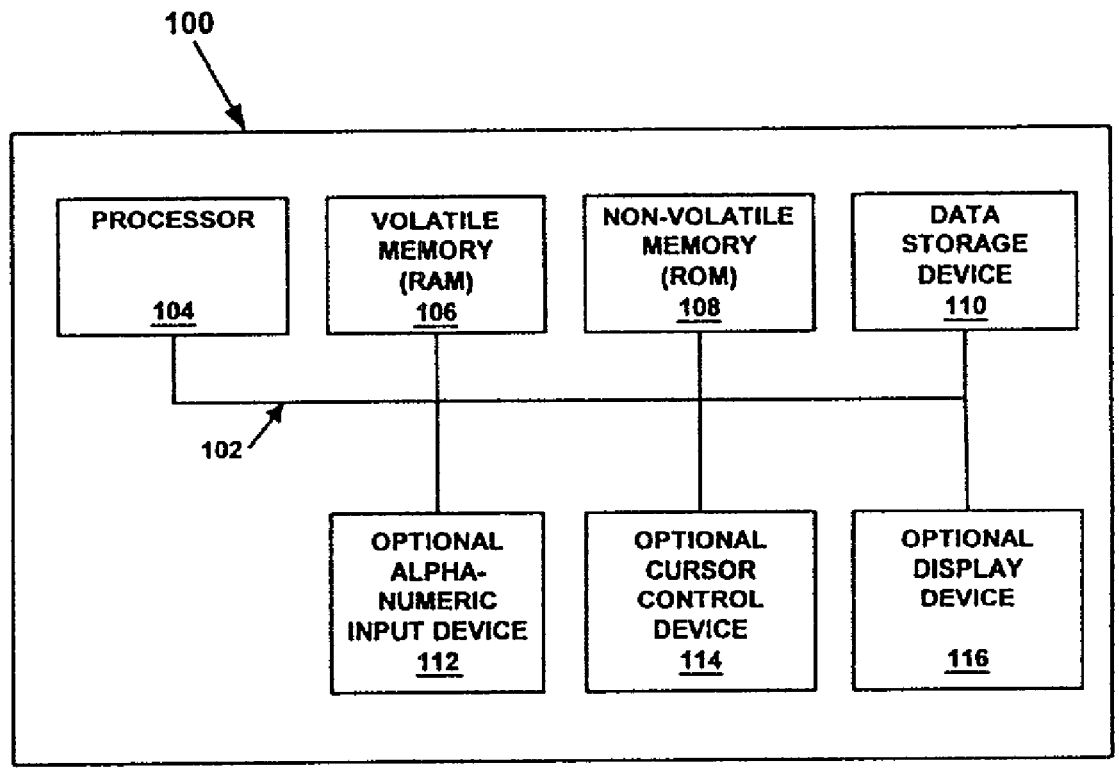
FIG. 1 is a schematic diagram of an exemplary computer system used to perform steps of the present method in accordance with various embodiments of the present claimed invention.

With reference now to FIG. 1, portions of the present method and system are comprised of computer-readable and computer-executable instructions which reside, for example, in computer-usable media of a computer system. FIG. 1 illustrates an exemplary computer system 100 used in accordance with one embodiment of the present invention. It is appreciated that system 100 of FIG. 1 is exemplary only and that the present invention can operate on or within a number of different computer systems including general purpose networked computer systems, embedded computer systems, routers, switches, server devices, client devices, various intermediate devices/nodes, stand alone computer systems, and the like. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity. Additionally, portions of the present embodiment are well suited to operating in conjunction with various mobile clients such as, for example, a cell phone, personal digital assistant (PDA), laptop computer, pager, and the like.

System 100 of FIG. 1 includes an address/data bus 102 for communicating information, and a central processor unit 104 coupled to bus 102 for processing information and instructions. Central processor unit 104 may be an 80×86-family microprocessor. System 100 also includes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage unit 110 (e.g., a magnetic or optical disk and disk drive) coupled to bus 102 for storing information and instructions. System 100 of the present invention also includes an optional alphanumeric input device 112 including alphanumeric and function keys coupled to bus 102 for communicating information and command selections to central processor unit 104. System 100 also optionally includes an optional cursor control device 114 coupled to bus 102 for communicating user input information and command selections to central processor unit 104. System 100 of the present embodiment also includes an optional display device 116 coupled to bus 102 for displaying information.

Referring still to FIG. 1, optional display device 116 of FIG. 1, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. A more detailed discussion of the present invention is found below.

GENERAL METHOD AND SYSTEM FOR RELIABLY AND EFFICIENTLY STREAMING MEDIA TO FIXED AND/OR MOBILE CLIENTS

As an overview, the present invention provides a method and system for streaming media to fixed and/or mobile clients wherein the method and system achieve improved efficiency by using complementary information (as opposed to duplicate information employed in conventional approaches). The present invention further provides a method and system for streaming media to fixed and/or mobile clients wherein the method and system improve reliability by using various forms of diversity to prevent single points of failure.

For purposes of clarity and brevity, the following discussion and examples will specifically deal with video data. The present invention, however, is not limited solely to use with video data. Instead, the present invention is well suited to use with audio-based data, speech-based data, image-based data, web page-based data, graphic data and the like. Of course, buffering and downloading are allowed, and various degrees of buffering can be accommodated in this system; thus, this system supports both live and buffered media streams. Furthermore, note that all these media types can be coded with the properties of multiple description bitstreams described herein.

One approach for reliably delivering streaming media is disclosed in commonly-owned, co-pending U.S. patent application Ser. No. 09/400,416, entitled "Video Communication Using Multiple Streams", filed Sep. 21, 1999 to J. G. Apostolopoulos. Another approach for reliably delivering streaming media is disclosed in commonly-owned, co-pending U.S. patent application Ser. No. 09/784,226, entitled "Method and System for Packet Communication Employing Path Diversity" filed Jan. 19, 2001 to J. G. Apostolopoulos et al. Yet another approach for reliably delivering streaming media is disclosed in commonly-owned, co-pending U.S. patent application Ser. No. 09/784,223, entitled "Video Communication System Employing Multiple State Encoding and Path Diversity", filed Jan. 19, 2001 to J. G. Apostolopoulos. U.S. patent application Ser. No. 09/400,416, U.S. patent application Ser. No. 09/784,226, and U.S. patent application Ser. No. 09/784,223 are each incorporated herein by reference as background material. These patent applications relate to a system for reliable video communication over lossy packet networks while preserving high compression efficiency. Portions of the prior work were composed of two systems: (1) a multiple description video coding system, and (2) a path diversity transmission system.

Figure 2:
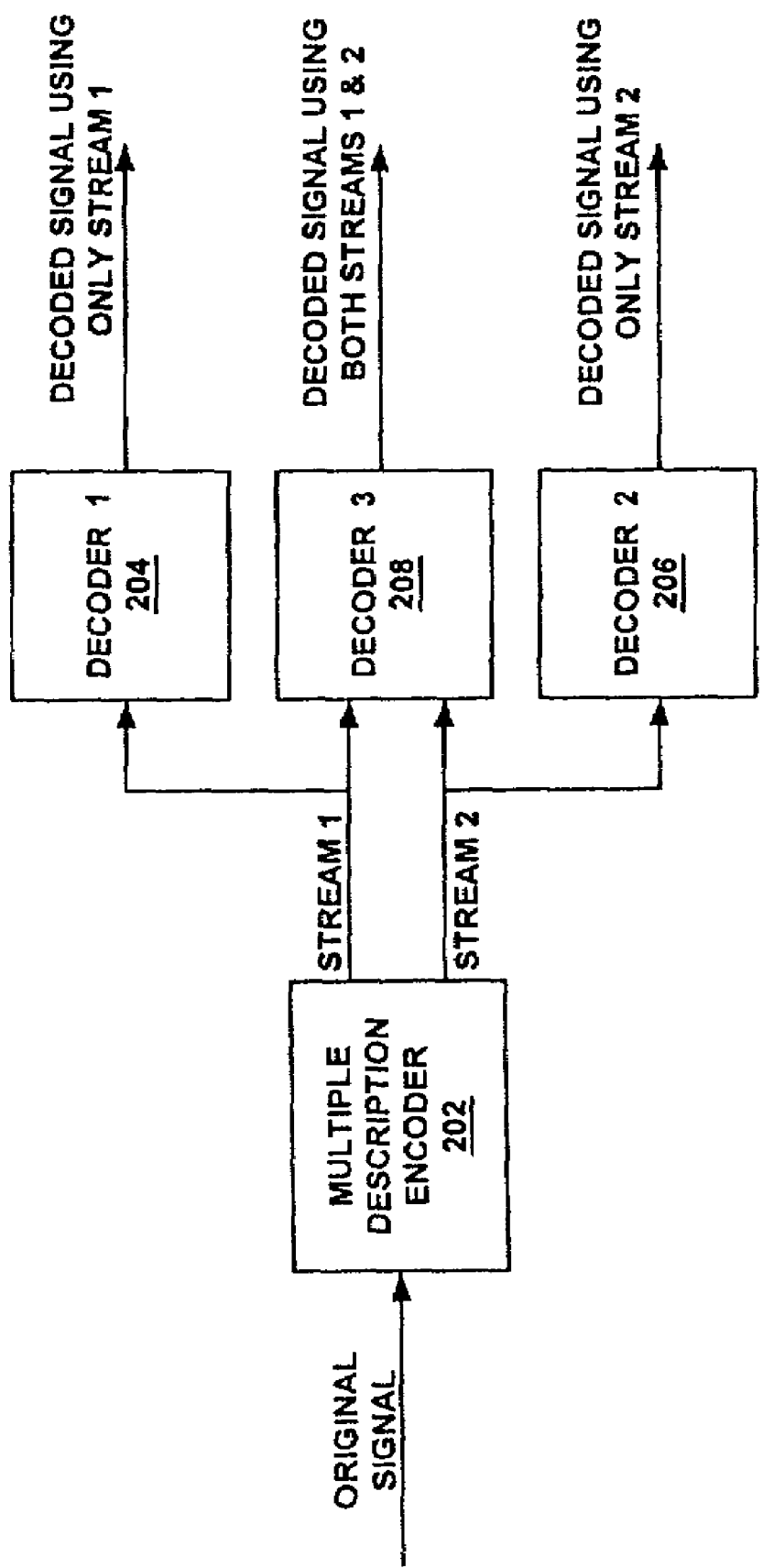
FIG. 2 is a schematic diagram illustrating multiple description coding of media data as employed in accordance with various embodiments of the present claimed invention.

With reference now to FIG. 2, a schematic diagram illustrating multiple description coding of media data as employed in conjunction with various embodiments of the present invention is shown. Multiple Description Coding (MDC) refers to one form of compression where the goal is to code an incoming signal into a number of separate bitstreams, where the multiple bitstreams are often referred to as multiple descriptions. These separate bitstreams have the property that they are all independently decodable from one another. Specifically if a decoder receives any single bitstream it can decode that bitstream to produce a useful signal (without requiring access to any of the other bitstreams). MDC has the additional property that the quality of the decoded signal improves as more bitstreams are accurately received. For example, assume that a video is coded with MDC into a total of N streams. As long as a decoder receives any one of these N streams it can decode a useful version of the video. If the decoder receives two streams it can decode an improved version of the video as compared to the case of only receiving one of the streams. This improvement in quality continues until the receiver receives all N of the streams, in which case it can reconstruct the maximum quality. As shown in FIG. 2, a multiple description encoder 202 codes an original signal into two streams, referred to as stream 1 and stream 2. In the example of FIG. 2, there are three decoders 204, 206, and 208. Each of decoders 204, 206, and 208 receive different bitstreams. Decoder 1 204 receives only stream 1 and decodes that stream to produce usable video. Decoder 2 206 receives only stream 2 and decodes that stream to produce usable video. Decoder 3 208 receives both stream 1 and stream 2 and decodes both streams to produce higher quality video than either decoder 1 204 or decoder 2 206.

There is a critical difference between the present multiple description based approach for streaming media delivery and prior approaches, such as scalable or layered coding approaches for streaming media delivery. Namely, in scalable or layered coding the video is also coded into multiple bitstreams, however one bitstream, referred to as the baselayer bitstream, is critically important and must be correctly received in order to produce a usable decoded media stream. Specifically, in the conventional scalable or layered approaches for streaming media delivery, even if all the bitstreams except the baselayer bitstream are correctly received, they are essentially useless unless the baselayer bitstream is correctly received, creating a single point of failure. The present multiple description based streaming media delivery does not have this problem since as long as any multiple description bitstream is received it can be decoded to produce usable quality video, and as more multiple description bitstreams are received the quality of the decoded video increases.

There are a number of different approaches to achieve MDC coding of video. One approach is to independently code different frames into different streams. For example, each frame of a video sequence may be coded as a single frame (independently of the other frames) using only intra frame coding, e.g. JPEG, JPEG-2000, or any of the video coding standards (e.g. MPEG-1/2/4, H.261/3) using only I-frame encoding. Then different frames can be sent in the different streams. For example, all the even frames may be sent in stream 1 and all the odd frames may be sent in stream 2. Because each of the frames is independently decodable from the other frames, each of the bitstreams is also independently decodable from the other bitstream. This simple form of MDC video coding has the properties described above, but it is not very efficient in terms of compression because of the lack of inter-frame coding.

A preferred embodiment of MDC video coding that provides the above properties and achieves high compression is given in the prior patent. This MDC video coding system does not require a back-channel and therefore can be applied in a wide variety of applications (e.g. broadcast or multicast). In addition, it has the attractive property that it can be applied as a standard-compatible enhancement within MPEG-4 Version 2 (with NEWPRED) and H.263 Version 2 (with RPS). Therefore any MPEG-4 Version 2 decoder can decode the resulting bitstream while an enhanced decoder designed to perform state recovery as presented in the prior patent can provide improved error recovery. This preferred embodiment of MDC video coding is assumed through the following discussion. However, a different video compression algorithm that has the same MDC properties as discussed above may also be used in its place.

Following is a discussion of path diversity as employed in conjunction with various embodiments of the present invention. Consider the case of multimedia communication over a packet network such as the Internet. Communication over the Internet is often hampered by congestion and packet loss. An important observation is that while one node or path in the network may be congested, other nodes or paths may have ample bandwidth. It would be advantageous to know the instantaneous quality of each path and to use that information to send packets along the "best" path (much like listening to a traffic report before leaving for work). However this is very difficult for a number of reasons, including the fact that the congested areas can vary quite rapidly.

While it may not be possible to know which paths are the best to use at any point in time, through appropriate system design one can still achieve significant performance improvements. Various embodiments of the present invention employ a path diversity system which explicitly sends different subsets of packets for an application over different paths, as opposed to the default scenario where the stream of packets proceeds along a single path. By using multiple paths at the same time some amount of averaging occurs and the end-to-end application effectively sees an "average" path behavior. Generally, seeing this average path behavior provides better performance than seeing the behavior of any randomly chosen individual path. For example, the probability that all of the multiple streams that are transmitted on different paths are simultaneously congested and have losses is much less than the probability that a single path is congested. The benefits of path diversity include (1) the application sees a virtual average path which exhibits a smaller variability in communication quality than exists over an individual path, (2) burst packet losses are converted to isolated packet losses, and (3) the probability of an outage (where all packets in the packet stream are lost for the duration of the outage) is greatly reduced. These advantages provide some important benefits to multimedia communication performance under packet loss. As will be discussed in detail below, the various embodiments of the present invention routes MDC traffic through semi-intelligent nodes at strategic locations in the Internet, thereby providing a service of improved reliability while leveraging the infrastructure of the Internet.

Path diversity may also exist in wireless networks. Various embodiments of the present invention employ a soft-handoff system in which a mobile client can simultaneously communicate with multiple base stations. In such cases, the benefits of path diversity mentioned above are also realized in a wireless environment.

Additionally, the MD video coding and path diversity employed in conjunction with the various embodiments of the present invention are useful even if used separately. For example, MD video coding can provide improved reliability even when sent over a single path. Similarly, path diversity provides a virtual channel with improved characteristics, enabling a simpler system design. However, when used together, MD video coding and path diversity complement, and also to a certain extent enhance, each other's capabilities. MD video coding provides multiple independently decodable bitstreams, which the transmission system explicitly sends over different paths, and the transmission system provides the video decoder with a high probability that at least one of the streams will be received correctly at any point in time. In one preferred embodiment of MD video coding, this enables the video decoder to perform state recovery to recover a corrupted stream.

Figure 3A:
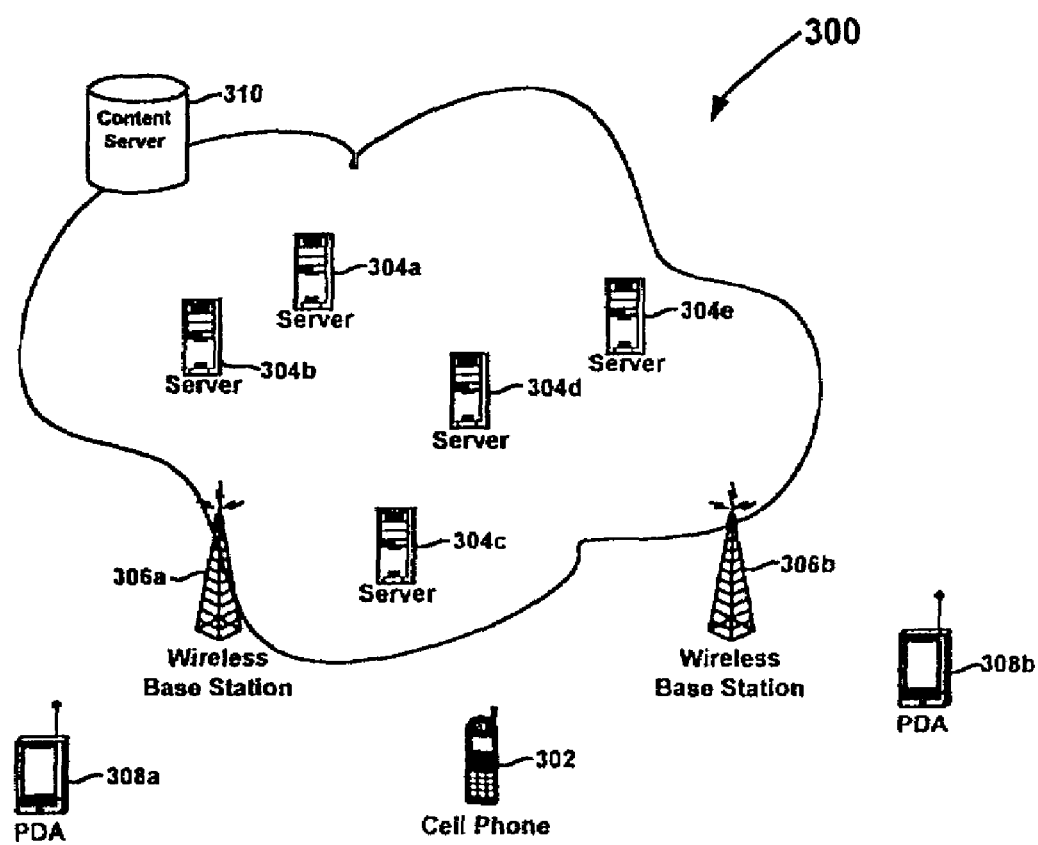
FIG. 3A is a schematic diagram illustrating a mobile client system employed in accordance with various embodiments of the present claimed invention.
Figure 4:
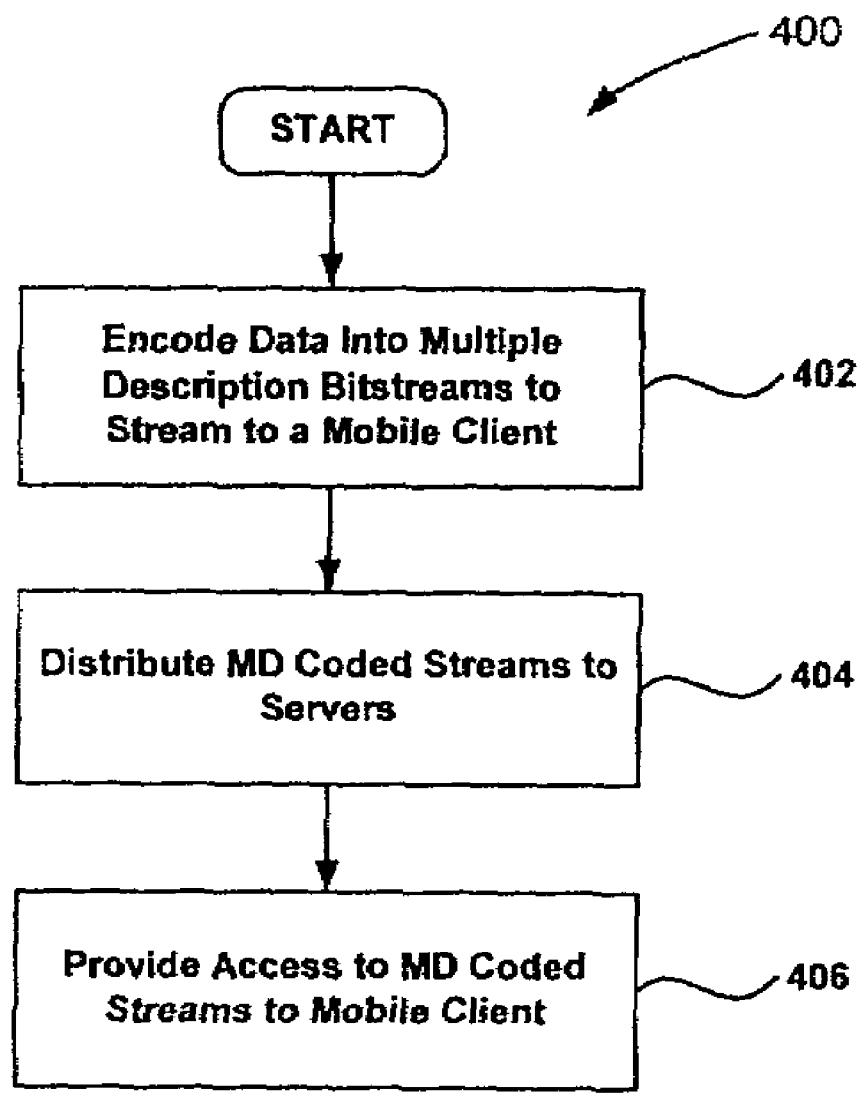
FIG. 4 is a flow chart of steps performed in accordance with one embodiment of the present claimed invention.

With reference next to FIG. 3A and flow chart 400 of FIG. 4, exemplary steps used by the various embodiments of present invention are illustrated. Flow chart 400 includes processes of the present invention which, in one embodiment, are carried out by a processor under the control of computer-readable and computer-executable instructions. The computer-readable and computer-executable instructions reside, for example, in data storage features such as computer usable volatile memory 106, computer usable non-volatile memory 108, and/or data storage device 110 of FIG. 1. The computer-readable and computer-executable instructions are used to control or operate in conjunction with, for example, central processing unit 104 of FIG. 1.

With reference again to FIG. 3A, a system 300 that delivers streaming media to mobile clients over hybrid wired/wireless networks in accordance with one embodiment of the present invention is shown. In one embodiment, system 300 consists of one or more servers (304a –304e), one or more wireless base stations (306a and 306b), and one or more mobile clients (e.g. cell phone 302 and/or personal digital assistants (PDAs) 308a and 308b) as shown in FIG. 3A. The system of the present invention may include a greater or lesser number of components than are specifically illustrated in the embodiment of FIG. 3A. As an example, although not always required, a content server 310 also forms a portion of the system of the embodiment of FIG. 3A. Importantly, in the following discussion, the term "server" in various embodiments is intended to encompass a device functionally resembling a computer (e.g. having computation ability, memory, and/or connectivity capability). A typical server according to the definition as used in the present application may include, but is not limited to, any computer (e.g. mainframe, corporate server, personal computer (PC), laptop, personal digital assistant (PDA), and the like). In various other embodiments of the present invention, the term "server" is intended to encompass a device not typically considered a computer but having similar capabilities. In such an embodiment, the server is comprised, for example, of an advanced cell phone.

Figure 3B:
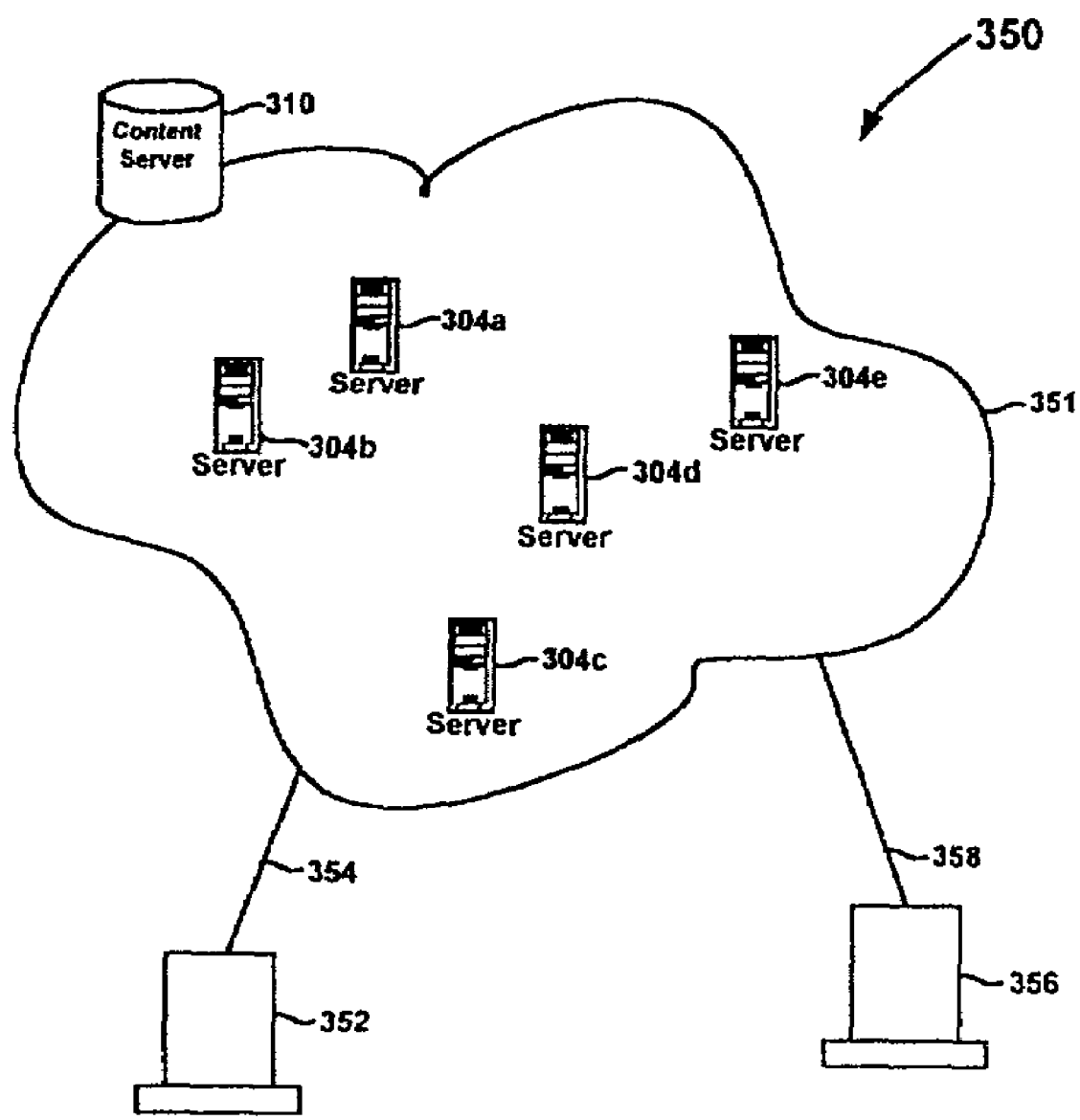
FIG. 3B is a schematic diagram illustrating a fixed client system employed in accordance with various embodiments of the present claimed invention.

Importantly, it should be noted that the methods of various embodiments of the present invention are applicable with fixed wired clients and/or mobile wireless clients. Specifically, the mobile client case is a more general and superset version of the fixed client case. For example, in the mobile client case, the MD bitstreams are provided by a server or servers to a mobile client through one or more base stations. In contrast, the corresponding fixed (wired) client case would have the server or servers instead provide the MD bitstreams directly to the fixed client without the need for a base station. Therefore, in the following discussion, will specifically discuss the more general and superset mobile client case. For purposes of brevity and clarity, redundant examples of fixed client cases are not presented herein. It will be understood by one of ordinary skill in the art, however, that in an example in which MD bitstreams are provided by a server or servers to a mobile client by one or more base stations, in the fixed client case the server or servers would instead provide the MD bitstreams to the fixed client without the need for a base station. With reference now to FIG. 3B, a system 350 that delivers streaming media to fixed clients over a network (e.g. the Internet) in accordance with one embodiment of the present invention is shown. In one embodiment, system 350 consists of one or more fixed clients (e.g. personal computers 352 and 356), one or more servers (304a–304e), and a content server 310. In the present embodiment fixed client 352 is coupled to network 351 via a wired link 354. Similarly, fixed client 356 is coupled to network 351 via a wired link 358. The system of the present invention may include a greater or lesser number of components than are specifically illustrated in the embodiment of FIG. 3B. As an example, although not always required, content server 310 also forms a portion of the system of the embodiment of FIG. 3B. As mentioned above, in the following discussion, the term "server" in various embodiments is intended to encompass a device functionally resembling a computer (e.g. having computation ability, memory, and/or connectivity capability). A typical server according to the definition as used in the present application may include, but is not limited to, any computer (e.g. mainframe, corporate server, personal computer (PC), laptop, personal digital assistant (PDA), and the like). In various other embodiments of the present invention, the term "server" is intended to encompass a device not typically considered a computer but having similar capabilities. In such an embodiment, the server is comprised, for example, of an advanced cell phone.

Furthermore, it should be noted the present invention is well suited to use in any of a variety of wired and/or wireless networks, and also in the various combinations thereof. For example, embodiments of the present invention are well suited to use in: wired and wired networks (e.g. a wired network infrastructure also having a wired connection to the client); wired and wireless networks (e.g. a wired network infrastructure having a wireless connection to the client); wireless and wired networks (e.g. a wireless network infrastructure having a wired connection to the client); and wireless and wireless networks (e.g. a wireless network infrastructure also having a wireless connection to the client). More specifically, the methods of the present invention are also applicable if all of the links are wireless, as in the case of an ad-hoc wireless network where some of the nodes are acting as servers and others as clients. Note that a node may act as both a server (source of information) and a client (sink of information) at the same time. An interesting example of this later case is when each node is a laptop or PDA with a wireless connection. Also note that each cell phone may act as both a sender and receiver of MD streams in a wireless/wired/wireless situation.

Referring now to FIGS. 3A and 3B, in following discussions in which, for example, MD bitstreams are provided by a server or servers to a mobile client through one or more base stations (as shown in FIG. 3A), the corresponding fixed client case would have the server or servers instead provide the MD bitstreams to the fixed client without the need for a base station. Hence, it can be seen that the below recited mobile client-based examples and discussions are applicable as well to fixed client systems. That is, the following mobile client-based examples and discussions are not intended to limit the present invention to applicability only in mobile client systems.

With reference now to flow chart 400 of FIG. 4, steps performed in accordance with one embodiment of the present invention are shown. Although specific steps are disclosed in flow chart 400 of FIG. 4, such steps are exemplary. That is, the present invention is well suited to performing various other steps or variations of the steps recited in FIG. 4. At step 402, the present embodiment encodes data to be streamed to a mobile client into two or more MD streams. In one embodiment, the data to be streamed is comprised of a video sequence. As mentioned above, MD streams have the property that any subset of them can be decoded into a media stream whose quality depends on the number of decoded streams. In the present embodiment, this encoding may be done in real time or it may be done in advance in which case the pre-computed MD streams are stored on a content server (e.g. content server 310 of FIG. 3).

Referring still to step 402, in the present embodiment, the present invention uses specially designed multiple description media streams which contain complementary information (as opposed to duplicating the information). Specifically, the original media stream is coded using a multiple description algorithm into a number of separate descriptions or bitstreams. These descriptions have the property that (1) each bitstream is independently useful to the client, and (2) each bitstream contains complementary information. For example, consider the case of multiple description coding with two descriptions. As long as the receiver receives either of the bitstreams, it can decode a usable media stream. If the receiver receives both bitstreams it can decode a higher quality media stream than if it had received either bitstream alone. In addition, the MD streams provide these properties while requiring only slightly higher total bit rate than that required by a conventional coding algorithm that does not provide these properties. Additionally, an important point is that each description or MD bitstream is equally important. This is in contrast to conventional scalable schemes, where the base-layer bitstream is critically important. That is, in conventional scalable schemes, if the base-layer bitstream is lost the other bitstream(s) are useless. Specifically, since each MD bitstream is equally important in the present embodiment, there is no single point of failure in the sense that there is no single bitstream that must be received.

At step 404, the present embodiment then distributes the MD streams to a number of different servers (e.g. servers 304a–304e of FIG. 3) placed at intermediate nodes throughout a network. By, appropriately distributing the MD streams, the present invention eliminates the possibility that any single fault may render all streams useless. In one embodiment, the present invention uses servers that are placed at intermediate nodes in the network, for example alongside a router or a wired/wireless gateway. In the present embodiment, servers 304a–304e send the MD streams to nearby wireless base stations 306a and 306b as mobile clients 302, 308a, and 308b roam through their coverage areas. Wireless base stations 306a and 306b receive data from the wired network and wirelessly transmit this data to mobile clients 302, 308a and 308b. Likewise, wireless base stations 306a and 306b wirelessly receive data from mobile clients 302, 308a and 308b and transmit this data to the wired network. Thus, wireless base stations 306a and 306b can be viewed as having a wired/wireless gateway and a wireless transmitter/receiver. Furthermore, as will be described in detail below, the various embodiments of the present invention overcome the non-guaranteed, best-effort nature of existing networks by dynamically delivering MD streams to mobile users from the most accessible servers based on user mobility, network congestion, and server load.

With reference still to step 404, the present invention ensures that no single fault causes the loss of all streams. In the context of the above example, a video sequence media stream may be coded into two MD streams which are then placed at two different storage modules, connected to two different servers at two different locations in the network. In so doing, the two MD streams can be sent over two different paths in the wired network, and two different base stations may transmit the two MD streams over two different wireless channels to the receiving client. In this manner, the present embodiment achieves a level of diversity which eliminates many potential single points of failure.

Referring now to step 406, the present embodiment provides access to the MD coded streams for a mobile client. That is, the MD streams are accessible to, for example, a requesting cell phone, PDA, laptop computer, or other such mobile client.

Referring again to steps 402, 404 and 406, a detailed example (using FIG. 3A for illustration) is provided below of the operation of the present embodiment. In the present example, a video sequence media stream has previously been coded into two MD streams which were then both stored on content server 310. The first of the two MD streams is placed at a first storage module, coupled to server 304a. The second of the two MD streams is placed at a second storage module coupled to server 304e. When the video sequence media stream is requested, for example, by cell phone 302, the first of the two MD streams is sent over a first path to cell phone 302, and the second of the two MD streams is sent over a second path to cell phone 302. In the present example, the first path comprises transmission over a wired network connection from server 304a ultimately to wireless base station 306a, and then wirelessly transmitting the first MD stream of the requested video sequence from wireless base station 306a to cell phone 302. Furthermore, in the present example, the second path comprises transmission over a wired network connection from server 304e ultimately to wireless base station 306b, and then wirelessly transmitting the second MD stream of the requested video sequence from wireless base station 306b to cell phone 302. The MD streams of the present embodiment have the property that any number of streams can be decoded into a sequence in which the quality of the decoded sequence depends on the number of decoded MD streams. Specifically, any one MD stream can be decoded into baseline quality data; any two MD streams can be decoded into improved quality data; and so on until finally all the MD streams can be decoded into the highest quality data. Thus, should one of the paths fail in the preceding example (e.g. the second path), cell phone 302 is still able to receive and utilize the requested video sequence based solely on receiving only one of the MD streams.

Although such first and second paths are recited in the present example, the present invention is well suited to use with the numerous paths which can be constructed within, for example, the network of system 300. Additionally, although two MD streams are recited in the present description, the present invention is well suited to use with more than two MD streams of data. Thus, the present embodiment, composed of multiple description coding and system diversity, provides improved system reliability in a more efficient manner than the conventional approach of resource duplication. Furthermore, the proposed system enables the elimination of a number of single points of failure that afflict conventional systems. Also, as mentioned above, for purposes of clarity and brevity, the above and following discussion and examples may specifically deal with video data. The present invention, however, is not limited solely to use with video data. Instead, the present invention is well suited to use with audio-based data, speech-based data, image-based data, graphic data, web page-based data, and the like.

Thus, the present invention provides a method and system for streaming media to fixed clients and/or mobile clients. The present invention further provides a method and system for streaming media to fixed clients and/or mobile clients wherein the method and system provides increased reliability and efficiency over conventional systems.

Furthermore, the multiple description bitstreams may be placed on servers in a variety of ways depending on the specific situation. For example, some servers may store all of the descriptions, while other servers may store only a subset of the descriptions. An example of the former is a central server which has high connectivity to a large number of clients, it may store all of the descriptions and adaptively choose to transmit a specific subset of the descriptions to each specific client based on the client's particular situation (e.g. the other servers that the client is connected to and the descriptions that these other servers can provide). On the other hand there may be other servers for which only a subset of the descriptions are stored, for example only the first description may be stored on some servers and the second description may be stored on other servers. The strategy for distributing descriptions to different servers may depend on a number of factors such as each server's compute and storage capabilities, its connectivity, typical network conditions, disjointness of paths, and the popularity of the specific media to be delivered.

When coding a specific media sequence, the media may be coded into multiple descriptions where each description requires the same bit rate and provides approximately the same quality. This may be referred to as balanced multiple description coding. Alternatively, the media may be coded into multiple descriptions where each description may require a different bit rate and may provide a different quality. This may be referred to as unbalanced multiple description coding. Coding a media into unbalanced multiple descriptions is important in situations where unbalanced operation is required, e.g. when one has unbalanced storage available at different servers or unbalanced available bandwidths on different paths. For both balanced and unbalanced multiple description coding, the key property is that as long as the client receives any subset of the multiple descriptions it can produce a usable decoded media stream, and that as it receives more descriptions the quality of the decoded media stream would increase.

A media sequence may be initially coded into balanced multiple description bitstreams, where each bitstream requires approximately the same bit rate, and these multiple descriptions streams may be appropriately placed at different servers in the network. These MD bitstreams may be subsequently transcoded to different lower bit rates in order to appropriately match the bandwidths available to a client at any particular time. For example, if a specific client requires unbalanced operation, e.g. if there are two paths available to the client and the available bandwidth of each path is different, the servers can transcode the multiple description bitstreams to the appropriate bit rates available on each path. Furthermore, the available bit rate along a specific path may vary as a function of time, and the server responsible for delivering the multiple description bitstream along that path can then appropriately transcode the bitstream to match the available bit rate on that path as a function of time. In this manner, the system can efficiently use the available bandwidth to maximize the reconstructed quality at the client.

The distribution of multiple description bitstreams to different servers, as well as the assignment of different servers to transmit different MD bitstreams to a specific client, depends on a number of factors including: demand on each server, available bandwidth and loss along the path from each server to the client, and the disjointness of the multiple paths.

The issue of disjointness does not arise in prior work since conventional approaches transmit a single bitstream along a single path. In the proposed approach multiple bitstreams are explicitly transmitted along multiple paths, and it is desired that these multiple paths be as disjoint as possible in order to minimize the probability that a single fault may lead to the loss of all of the multiple descriptions. For example, in the case of two MD bitstreams, each stream is sent over a separate path from a server to the client. Each of these paths consists of a sequence of links, and these two paths may include a number of shared links as well as a number of links that are not shared. Shared links are referred to as joint links and unshared links are referred to as disjoint links. Ideally, all of the links on the two paths are disjoint. However, in practice this may sometimes not be possible. The primary goal is to minimize the number of lossy joint links. For example, if an approximately lossless backbone link is joint or shared by both paths it will not effect the communication quality since the link is lossless. However, a lossy joint link can have a detrimental effect on the performance of the system since any losses, e.g. produced by congestion, may lead to the loss of both descriptions. Therefore, given a particular client, the system carefully chooses two servers to send the two multiple descriptions to the client such that these servers have maximally disjoint paths between them and the client. Furthermore, to distribute MD streams on a set of servers, the anticipated location of clients as well as the connectivity between each server and the anticipated clients are taken into account in order to determine the distribution that would enable the maximally disjoint paths between servers and anticipated clients. Of course, other more conventional metrics such as available bandwidth and losses on each link are also taken into account in this optimization. These conventional metrics are not discussed as they are also used in conventional systems.

INITIAL MULTIPLE DESCRIPTION BITSTREAM PLACEMENT AND REDISTRIBUTION ON SERVERS

As will be discussed in greater detail below, the MD media bitstream system of the various embodiments of the present invention must perform a number of steps prior to and during a streaming session. The present section specifically discusses the assignment and distribution to servers, e.g. servers 304a–304e, located throughout a network such as is shown in FIG. 3A.

In the present embodiment, prior to or upon a client request, the appropriate data (e.g. a video sequence) is coded into MD bitstreams. Next, the MD bitstreams are assigned and distributed to servers that are located throughout the network. To dynamically minimize end-to-end (i.e. server-to-client) delay, content is placed at servers at regions with highly anticipated demand (e.g. hot spots). Moreover, MD bitstreams are distributed among servers in a way so any client can find a complete set of MD bitstreams in its closest vicinity.

The present embodiment provides a method to 1) initially populate servers with MD bitstreams from content providers, and 2) redistribute the MD bitstreams among servers after the initial population. The initial server population method of the present embodiment takes place when fresh content needs to be distributed initially to servers in anticipation of client requests, and also when a client requesting content encounters a miss at one or more servers in the client's vicinity. As an example, the present initial server population method is employed when a client requests a movie trailer that has not yet been loaded to any server.

The redistribution of the MD bitstreams among the servers method of the present embodiment takes place when parameters such as, for example, usage patterns, mobility trends, network conditions, disjointness of paths to mobile clients, computation sizes and/or bitstream sizes change. One embodiment of the present method also considers such parameters during initial population of the servers with the MD bitstreams. Other parameters which provoke the redistribution of the MD bitstreams among the servers include, for example, network connectivity, network topology, server load, server storage space, server availability, and server I/O bandwidth. The present initial server population method is employed, for example, when, as a client moves, MD bitstreams are pre-fetched into servers at the new region if not available already.

Figure 5:
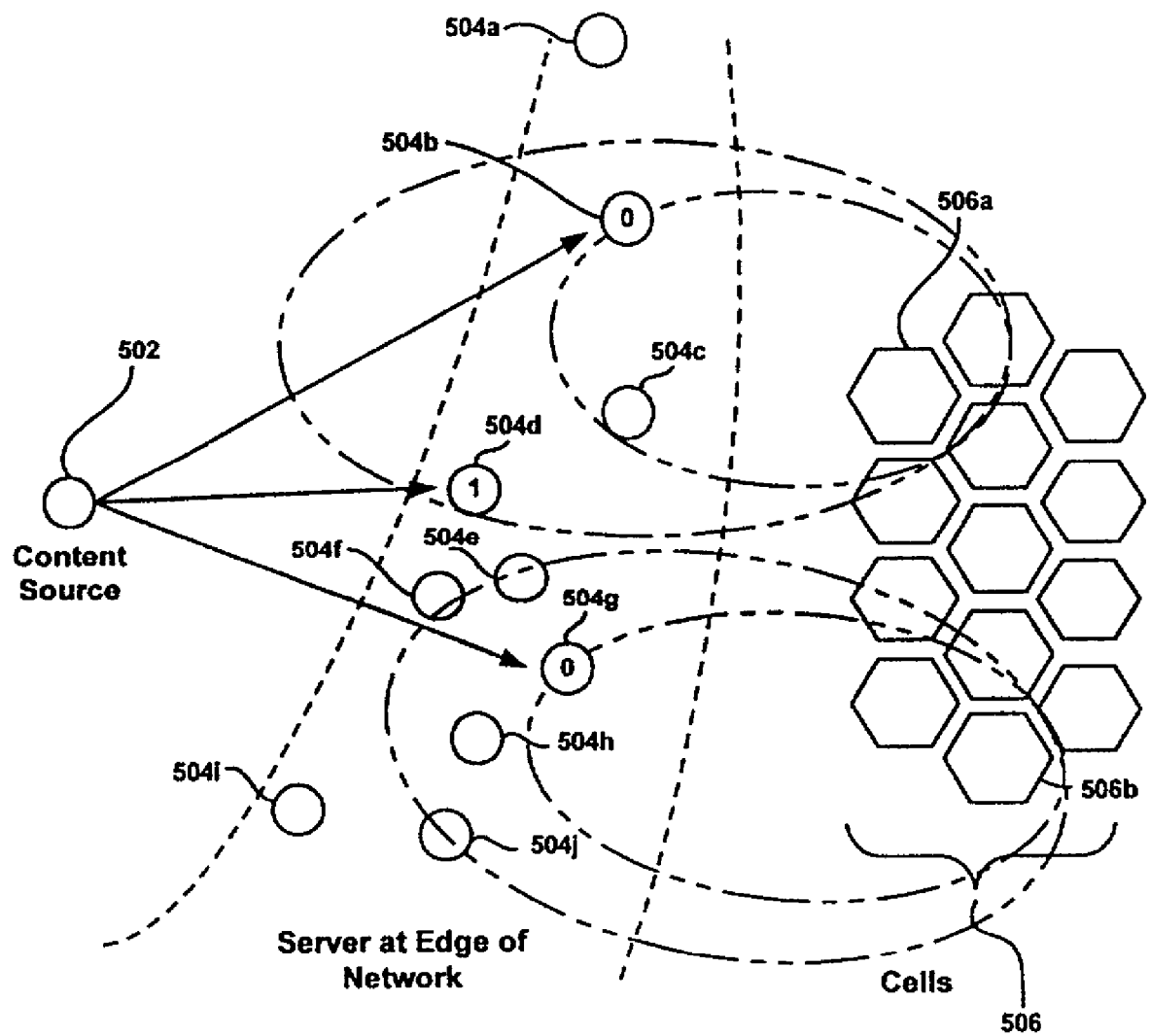
FIG. 5 is a schematic diagram of a content server, a plurality of servers having MD bitstreams stored thereon, and a series of cells in accordance with various embodiments of the present claimed invention.

The methods of the present embodiment will now be described in conjunction with FIG. 5 and flow chart 600 of FIG. 6. FIG. 5 is a schematic diagram illustrating a content source 502, a plurality of servers 504a–504j, and a plurality of cells 506 including cell 506a and cell 506b. Although specific steps are disclosed in flow chart 600 of FIG. 6, such steps are exemplary. That is, the present invention is well suited to performing various other steps or variations of the steps recited in FIG. 6. Furthermore, the following discussion will begin with the initial server population method of the present embodiment. With reference now to step 602 of FIG. 6, the present method first identifies the cell, c0, with the highest demand estimated in real-time, or anticipated highest demand in the foreseeable future above a certain threshold value, v, i.e. the present embodiment identifies the "hottest spot". If no such cell exists, then there is not enough client concentration to require server population according to the present embodiment. If such a cell does exist, the present embodiment proceeds to step 604. The present invention is well suited to varying the threshold value, v, to a desired value. For purposes of illustration, it will be assumed that cell 506a of FIG. 5 is found to be the cell with the highest demand above the threshold value, v. Also, in another embodiment of the present invention, a server is populated with the MD bitstreams when it exhibits high connectivity in the network, and, thus, is able to readily serve nearby hot spots with low delay and high bandwidth. In other words, in one such embodiment, even if a server is not located at the "hottest spot" or even at a hot spot, if it is close to a hot spot in terms of network conditions, then it can be populated with MD bitstreams.

At step 604, the present embodiment then initializes the number of servers (S) required to service this "hottest" cell, d, to be N, where N is the number of MD bitstreams composing the content to be streamed to the mobile client. Again for purposes of illustration, in the present embodiment, a video sequence has been coded into two MD bitstreams. The first MD bitstream is represented as "0" and the second MD bitstream is represented by a "1". Although only two MD bitstreams are recited in the above embodiment, the present invention is well suited to media coded into more than two MD bitstreams. Additionally, for purposes of clarity and brevity, the above and following discussion and examples may specifically deal with a video sequence. The present invention, however, is not limited solely to use with a video sequence. Instead, the present invention is well suited to use with audio-based data, speech-based data, image-based data, graphic data, web page-based data, and the like. Also, although d is set to be equal to N in the present example, the present invention is also well suited to setting the value, d, to be other than equal to N.

With reference still to step 604, because two MD bitstreams are recited above (i.e. because N is 2 in the present example), the present embodiment sets the number of servers (S), d, required to service the "hottest" cell, cell 506a, at two.

At step 606, the present embodiment then finds the d servers closest to the cell, c0, and determines whether those servers contain the N MD bitstreams. That is, the present method determines which subset of the available servers are disposed close to cell, c0. Thus, in the present example, the present embodiment finds the two servers which are closest to cell 506a. Note that in the present embodiment, "closeness" is weighted by the current network conditions so that a server with congested links will appear "far" from the hottest cell, c0, even though it may be topological close. In the present example, servers 504b and 504d are deemed closest to cell 506a. In the present example, the present method then determines if the two MD bitstreams are present at servers 504b and 504d. Furthermore, the present embodiments are metric-independent and, hence, will work for other convenient metrics of closeness such a geographical distance.

With reference still to step 606, if the closest servers contain the N MD bitstreams, then the present method is finished with the hottest cell, c0, and moves on to the next hottest cell (i.e. return to step 602). If the closest servers do not contain the N MD bitstreams, the present embodiment moves on to perform step 608. Thus, in the present example, if the two MD bitstreams of the video sequence are present at servers 504b and 504d, then the present method returns to step 602. If, on the other hand, the two MD bitstreams of the video sequence are not present at servers 504b and 504d, then the present method proceeds to step 608. Thus, in the illustration of FIG. 5, because the first MD bitstream, 0, is present at server 504b, and the second MD bitstream, 1, is present at server 504d, the present method would return to step 602. If, however, either the first MD bitstream, 0, or the second MD bitstream, 1, was not present at any of servers 504b and 504d, the present method would proceed to step 608. Such a condition would occur, for example, during an initial population of the servers according to the present method. That is, upon identification of the hottest cell, the required number of servers, and the determination of the closest servers (and assuming no prior population of the current MD bitstreams), it would be found that the MD bitstreams of interest would not be present at the closest servers (or any other servers). Thus, barring any prior population of the MD bitstreams of interest, the present method will ordinarily proceed to step 608.

At step 608, the present embodiment then determines if it is effective to distribute all N MD bitstreams to the d servers. As an illustrative example, it may not be effective to distribute all N MD bitstreams to the d servers when one or more of the servers are already very heavily loaded, lacks sufficient memory to store an MD bitstream, or is otherwise unsuited for the desired storage of the MD bitstream. In one embodiment, the present distribution step is dependent on server-dependent conditions such as load. For example, an MD bitstream is not placed on a particular server if that server is loaded over some specified threshold. The present invention is well suited to altering the aforementioned specific threshold to accommodate various objectives. As a result, in the present embodiment, a server that is lightly loaded is chosen over one that is closer to the hot spot (i.e. hottest cell, c0) but which already carries a heavy load. In the present example, if it is assumed that, for example, either the first MD bitstream, 0, or the second MD bitstream, 1, was not present at any of servers 504b and 504d, the present method would then determine if the two MD bitstreams could be distributed to servers 504b and 504d. If it is effective to distribute all N MD bitstreams to the d servers, the present method proceeds to step 612 described below. If, on the other hand, it is not effective to distribute all N MD bitstreams to the d servers, then the present method proceeds to step 610.

At step 610, if it was determined at step 608 that it is not effective to distribute all N MD bitstreams to the d servers, the present method increments the number of servers, d. In so doing, the present method increases the potentially available server space and then returns to step 606. Depending on the implementation, step 606 and step 608 do not have to consider the servers that were deemed not suitable for MD bitstream placement in the next iteration. That is, in one embodiment, the present invention increases the search space of suitable MD bitstream placement, but it is not necessary to consider the servers that did not pass step 606 and/or step 608 previously, unless the load conditions on those servers changed in the meantime. With reference to the present example, if the two servers 504b and 504d were not able to accommodate the storage of the two MD bitstreams, the number of servers would be increased from two to three. In one embodiment, the number of servers is incremented by selecting the next closest server to the hottest cell, c0. The present example would then return to step 606 and continue from that point.

At step 612, if it was determined at step 608 that it is effective to distribute all N MD bitstreams to the d servers, the present method then distributes the N MD bitstreams to the d servers. Hence, with reference to the present example, if the two servers 504b and 504d were cumulatively able to accommodate the storage of the two MD bitstreams thereon (and two MD bitstreams had not previously been stored thereon), the two MD bitstreams would be stored cumulatively on servers 504b and 504d. As a more specific example, in one embodiment, at least one of the MD bitstreams is stored on server 504b (e.g. MD bitstream 0) and at least one of the MD bitstreams (e.g. remaining MD bitstream 1) is stored on server 504d.

While the above description refers primarily to the first application of the present method (i.e. initial population of servers with MD bitstreams from content providers), the second portion of the present method (i.e. redistribution of the MD bitstreams among servers after the initial population) is somewhat similar. Specifically, in the case of redistribution of the MD bitstreams among servers after the initial population, the present method begins the method of steps 602–612 with updated user statistics to identify the hottest cell, and to determine if the new hot spots (i.e. hottest cells) are being properly serviced. Hence, the present embodiment enables dynamic reassigning of MD bitstreams based upon user defined criteria. As an example, in one embodiment, the method of the present invention (i.e. steps 602–612) is restarted each time interval of a predefined duration. In another embodiment, the method of the present invention is restarted based upon a hit or miss rate at a given server. In still another embodiment, the method of the present invention is restarted based upon certain known traffic patterns to which the network is subjected. In yet another embodiment, the method of the present invention is restarted based upon network congestion conditions. Various other embodiments of the present invention reassign MD bitstreams based upon other criteria. For example, in various embodiments, MD bitstreams are reassigned when: a server is overloaded (i.e. the server is running out of computational cycles); the storage capacity of a server is exceeded; or upon network partition (e.g. link failure which is different from congestion). Although such specific examples are recited above, the present method is well suited to dynamically reassigning the MD bitstreams to servers after the initial population thereof based upon various other parameters.

Figure 6:
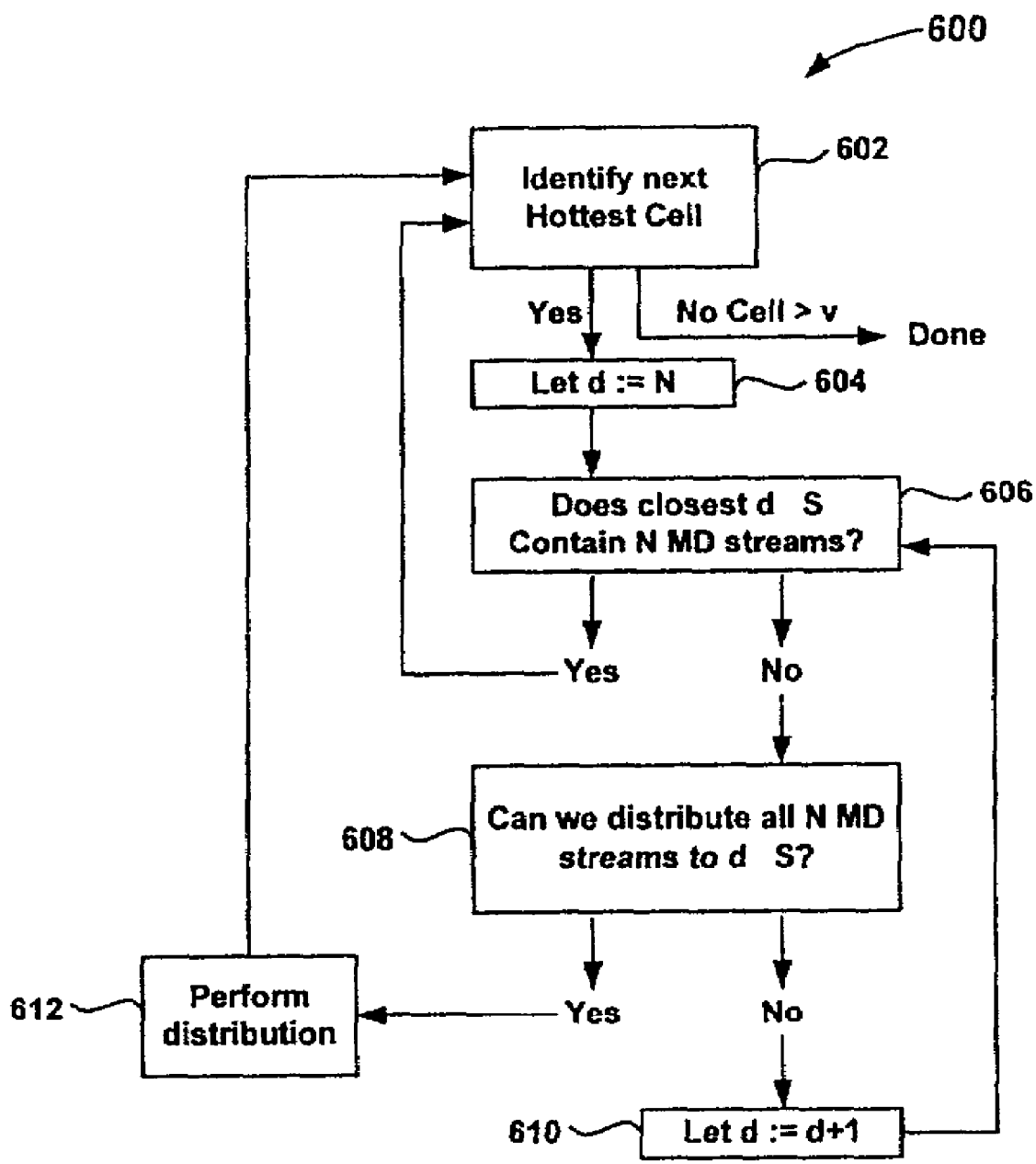
FIG. 6 is a flow chart of steps performed in accordance with one embodiment of the present claimed invention.

The present embodiment is also well suited to varying the method recited in steps 602–612 of FIG. 6 such that the data to be streamed is initially populated on or redistributed to portions of a network where greater activity is expected. For example, in one embodiment of present invention, the MD bitstreams are stored on or redistributed to those servers which are proximate to or accessed from a heavily traveled commute corridor. In so doing, the MD bitstreams are disposed more closely to the large quantity of mobile clients which are expected to be traveling along that commute corridor. In one embodiment of the present invention, during non-commute hours, the MD bitstreams are then redistributed from those servers which are proximate to or accessed from the heavily traveled commute corridor to a more appropriate location. More generally, the present method is well suited to varying the location at which the MD bitstreams are stored to accommodate anticipated mobile client location and demand.

Several distinct advantages are realized by the present method. For example, in conventional schemes, in order to have content to be streamed wholly available on a plurality of servers, the entire content would have to be completely duplicated and placed in its entirety on every one of the plurality of servers. Such duplication is extremely inefficient and consumes valuable memory space as well as disk space. To the contrary, the present invention generates a plurality of MD bitstreams of the content to be streamed. As stated above, separate MD bitstreams have the property that they are all independently decodable from one another. Specifically if a decoder receives any single bitstream it can decode that bitstream to produce a useful signal (without requiring access to any of the other bitstreams). Thus, in the present embodiment, the number of generated bitstreams can be spread over a larger number of servers without requiring the inefficient duplication associated with conventional systems. As an example, assume that a video sequence is MD coded into four MD bitstreams. In the present method, the four MD bitstreams could be individually placed on four respective servers located throughout a network (i.e. one description to each of the four servers). Thus, the present invention allows the data to be spread over a larger area thereby potentially providing easier access to a greater number of mobile clients, and/or increasing the range over which the data is readily available to a mobile client. Furthermore, the four MD bitstreams will cumulatively consume only slightly more memory than is necessary to store a single conventionally stored copy of the content to be streamed. In order to achieve such coverage using conventional methods, four complete duplicates of the entire content to be streamed would have to be placed on each of the above-mentioned four servers.

As yet another benefit, the present embodiment provides an intrinsic path diversity advantage without requiring inefficient complete duplication of data to be streamed. That is, using the above example of four MD bitstreams, the mobile client has the potential of requesting and receiving all four streams via four separate transmission paths. Thus, a single point of failure (e.g. a single server failure) or a network link failure (e.g. partitioning of the topology) does not prevent receipt by the mobile client of the streamed data.

As still another benefit, the present embodiment is also well suited to varying the method recited in steps 602–612 such that enhanced reliability is achieved. For example, a content provider may wish to ensure that mobile clients have superior access to the data to be streamed. In such a case, the content provider can opt to expand path diversity options and MD bitstream availability. In one extreme example, the method of the present embodiment would store all of the plurality of MD bitstreams on every available server such that the data is readily available to a mobile client in communication with the network. The present method is also well suited to a less drastic approach that does not store each of the plurality of MD bitstreams on every available server, but still provides enhanced reliability by increasing the number of servers on which the MD bitstreams are stored and/or by storing more than one of the MD bitstreams on the selected servers. More generally, the present method is well suited to varying the density of the stored MD bitstreams in the network.

As yet another benefit, the present invention is also well suited to transmitting MD bitstreams over a path which operates most effectively. That is, the present embodiment is also well suited to, for example, transmitting all MD bitstreams from a single server (on which all MD bitstreams happen to be commonly stored) if such an approach proves most expeditious. More generally, the present method is not limited to, for example, transmitting each of the separate MD bitstreams to a mobile client via different respective paths.

As still another benefit, the present invention also reduces input/output (I/O) bandwidth used on a server as compared to conventional approaches. That is, in the present embodiments, each MD bitstream is encoded at a lower bitrate than the original complete stream. Hence, the transmission of the MD bitstream can be accomplished at a bitrate which is lower than that required to transmit the original complete stream.

DYNAMIC SERVER SESSION ASSIGNMENT BASED ON SERVER AVAILABILITY, STREAM LOCATIONS, AND TRAFFIC CONDITIONS

As will be discussed in greater detail below, the MD media stream system of the various embodiments of the present invention must perform a number of steps prior to and during a streaming session. The present section specifically discusses the assignment of servers (e.g. servers 702a–704d) to a mobile client (e.g. mobile clients 706a–706i). For purposes of clarity, the embodiments of the present invention are described partly in conjunction with FIGS. 7A, 7B, and 7C. It should be noted, however, that streaming media system network 701 of FIGS. 7A–7C contains substantially the same components as system 300 of FIG. 3A. New FIGS. 7A–7C and system 701 are presented here, instead of again referring to FIG. 3A, so as to avoid unnecessarily crowding FIG. 3A with the additional illustrations included in FIGS. 7A–7C.

Furthermore, the following discussion will present three separate cases in which the present invention is employed. First, FIG. 7A, will discuss an embodiment in which two servers and a single base station are employed. FIG. 7B will then be used to illustrate an embodiment in which two servers and two base stations are employed. Lastly, FIG. 7C will be used to illustrate still another embodiment of the present invention is which one server and two base stations are employed. It should be understood, that in a fixed client embodiment of, for example, that depicted in FIG. 7A, the present invention may assign multiple servers to transmit multiple MD bitstreams to the fixed client rather than to one or more base stations. It should further be noted that the paths referred to in the present embodiments could be completely wired, or partially wireless. Also, the wireless part of different paths could go through different base stations (non-overlapping) or the same base station (overlapping). Even the wired parts of different paths could have some overlap.

Figure 7A:
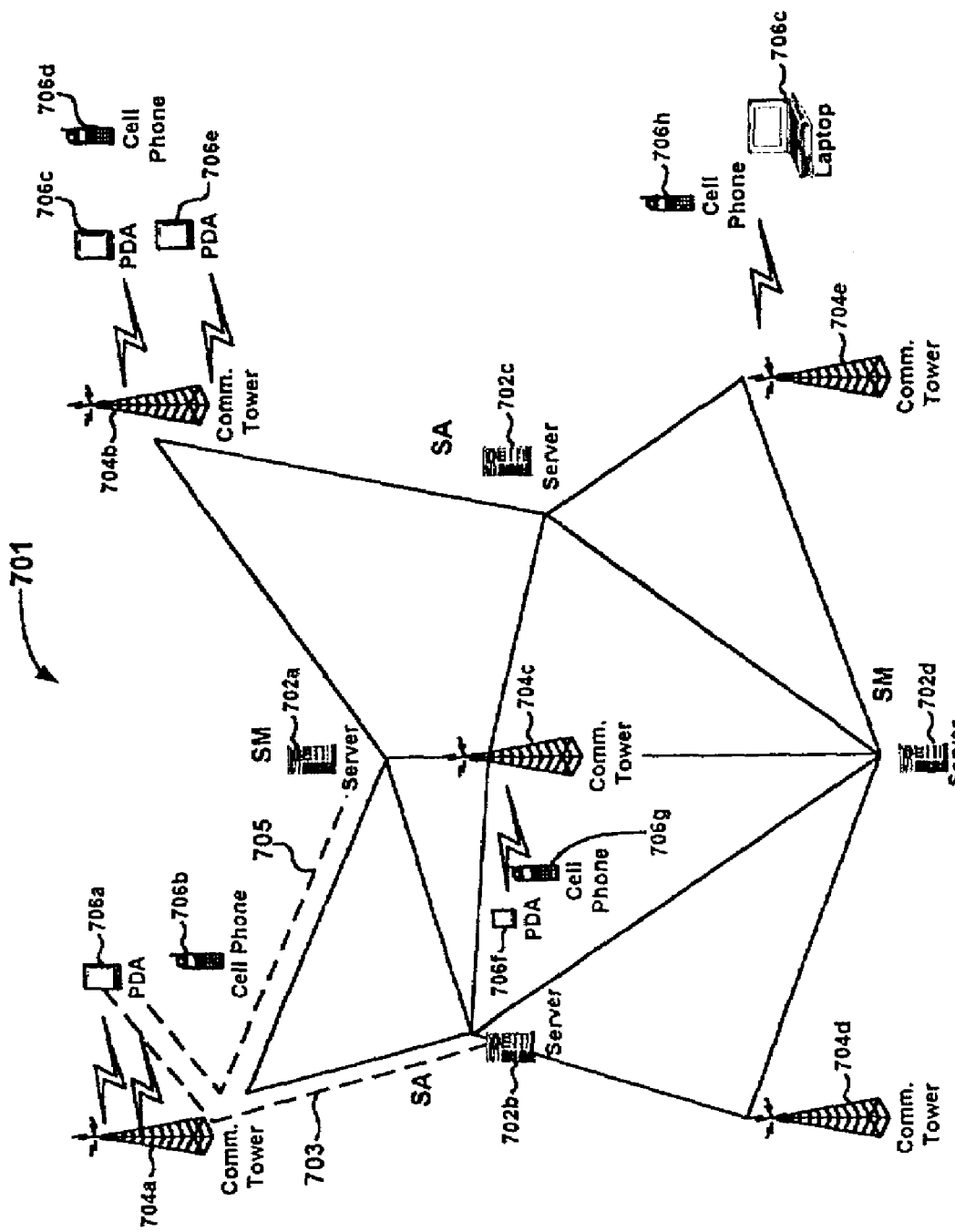
FIG. 7A is a schematic diagram of a plurality of servers operating in conjunction with a network management protocol, a series of base stations, and a plurality of mobile clients in accordance with various embodiments of the present claimed invention.
Figure 7B:
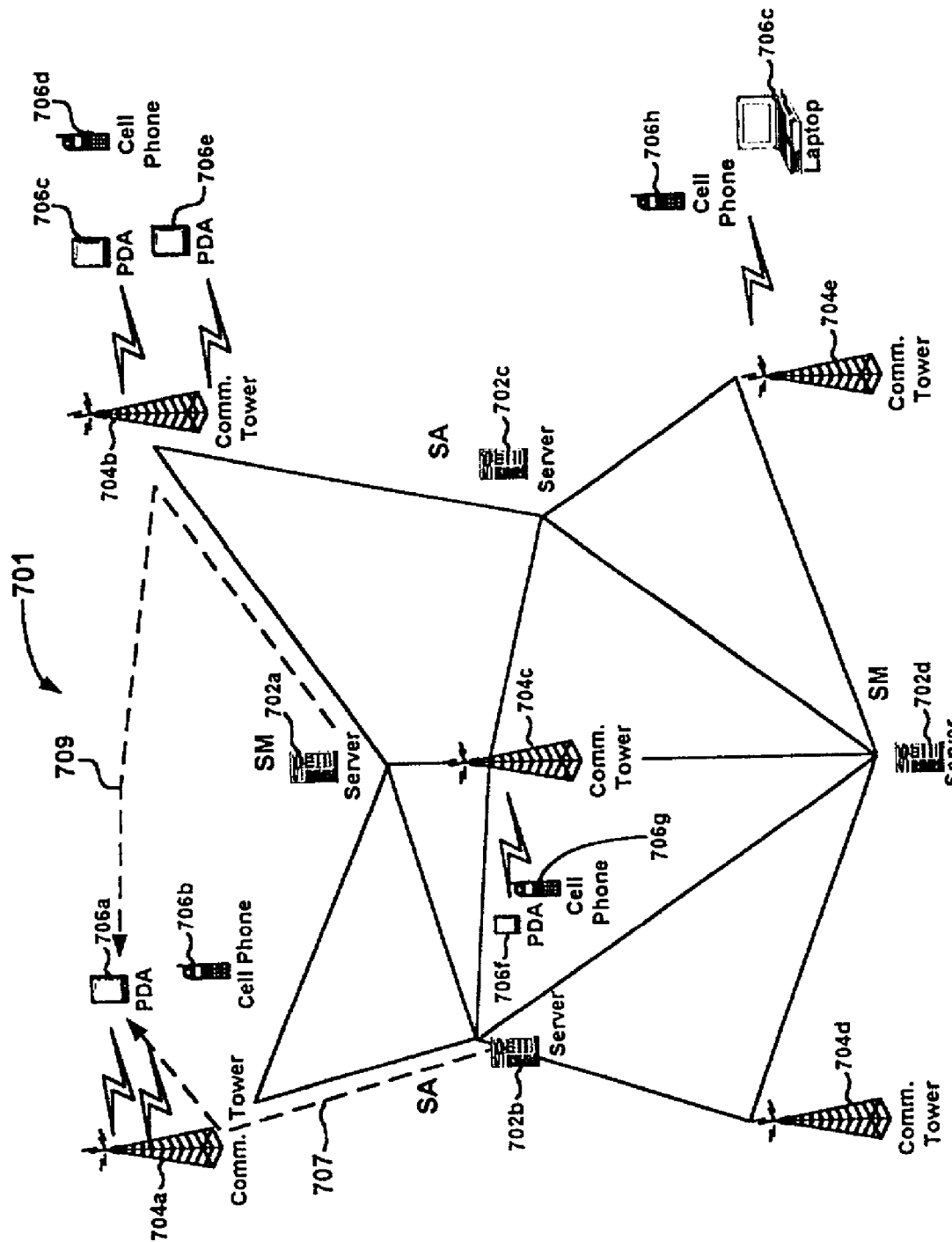
FIG. 7B is a schematic diagram of a plurality of servers operating in conjunction with a network management protocol, a series of base stations, and a plurality of mobile clients in accordance with various embodiments of the present claimed invention.
Figure 7C:
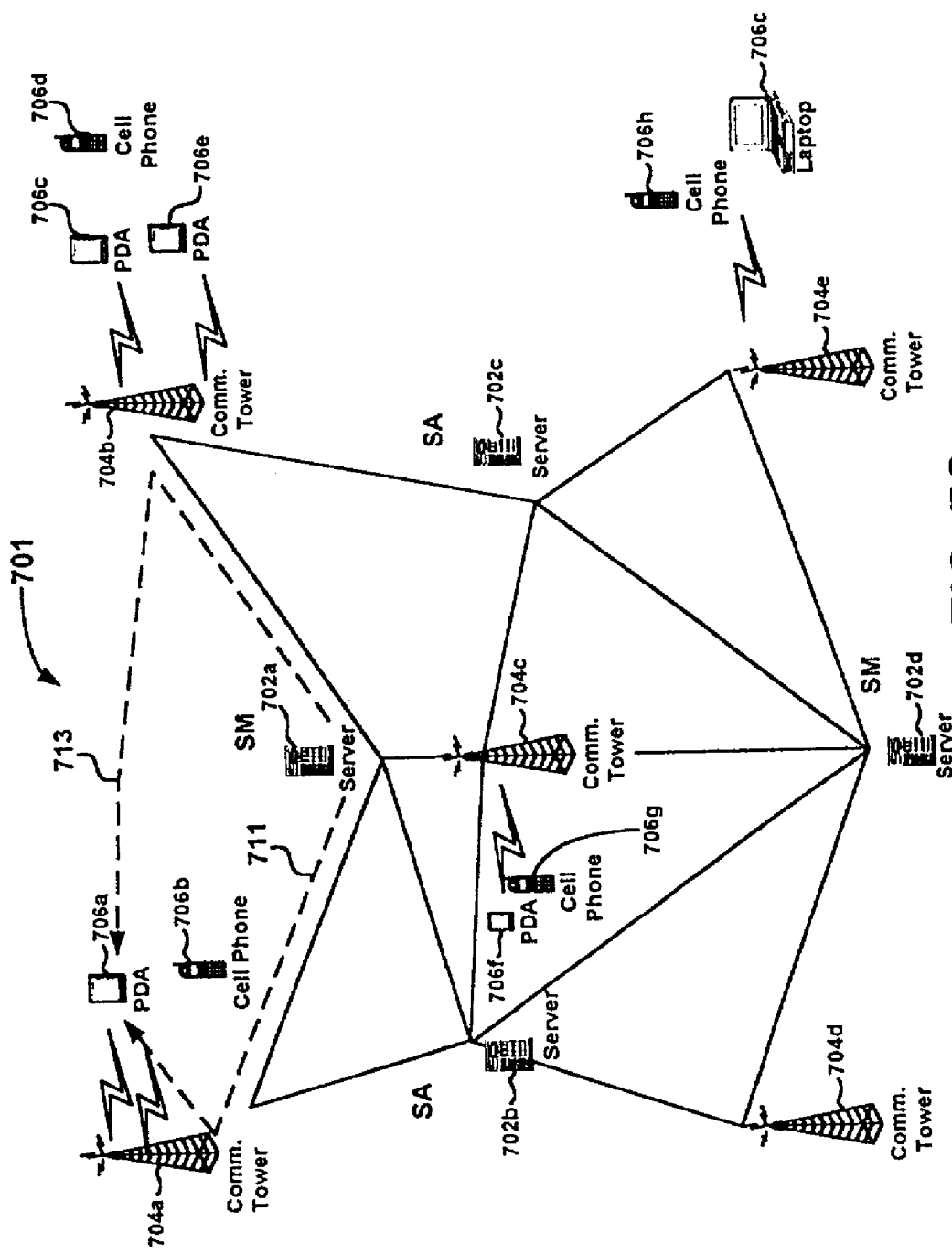
FIG. 7C is a schematic diagram of a plurality of servers operating in conjunction with a network management protocol, a series of base stations, and a plurality of mobile clients in accordance with various embodiments of the present claimed invention.

With reference now to FIG. 7A, in one embodiment, each of servers 702a–702d has the computational power to deliver a certain number of MD streams to one or more base stations (e.g. base stations 704a–704e) to which it has network connection of adequate network bandwidth. Base stations 704a–704e serve their respective cells. In the case of the arrangement depicted in FIG. 7A, base station 704a serves mobile clients 706a and 706b. Similarly, base station 704b serves mobile clients 706c, 706d, and 706e, base station 704c serves mobile clients 706f and 706g, and base station 704e serves mobile clients 706h and 706i. Although such an arrangement is depicted in system 701 of FIG. 7A, it will be understood that the various mobile clients may be served by other base stations as conditions change (e.g. a mobile client changes location, network congestion conditions change, and the like).

Referring still to FIG. 7A, if there is a fairly constant demand for MD streams from mobile clients within a cell, the peak demand will differ from the average demand by only a few percentage points. In that case, a static allocation of a server's computation power can be made so that it can handle the peak demand. When the demand is only average, the server's utilization will still be very high. However because of mobility, the base station (or base stations) serving a cell may find a large population of mobile clients temporarily located within the cell. So the number of MD streams that need to be served to that cell will reach a peak during such time periods. The peak demand will differ significantly from the average demand. Since this is a transient phenomenon, all cells adjacent to the one undergoing such overload are typically not overloaded themselves. As will be discussed below, in the present embodiment, better utilization of the server's computational power will be obtained by dynamically assigning the request for MD streams to servers which are currently in the best position to serve the MD streams to the base stations and ultimately to the mobile client.

In one embodiment of the present invention, a network management protocol such as, for example, the Simple Network Management Protocol (SNMP) is used to exchange information about load in different parts of the network and on different servers. Although the following discussion will pertain to a specific network management protocol, SNMP, such reference is intended to be exemplary and is not intended to limit the inventive concepts of the present invention. That is, the various embodiments of the present invention are well suited to the use of various network management protocols other than SNMP.

With reference again to FIG. 7A, the distribution of SNMP Managers (SM) and Agents (SA) among servers 702a–702d in one embodiment of the present invention is shown. SA refers to a server that runs an SNMP agent: software capable of answering valid queries in SNMP on different characteristics of the system, which in this case is the server. SM refers to a server which runs an SNMP Manager: software like network management systems that is capable of querying the SNMP agents and collecting information on network and server load. In various embodiments of the present invention, other points in the network such as, for example, routers and base stations 704a–704e, also run SNMP agents. The information from routers is also sent to neighboring SMs.

In the present embodiment, the present invention considers several factors such as the utilization of computational power on servers 702a–702d, the extent to which the streams have been cached on servers 702a–702d, and also the network bandwidth available from servers 702a–702d to the various base stations 704a–704e. Furthermore, in one embodiment of the present invention, it is assumed that placement of servers 702a–702d has been done a priori based on observed mobility patterns and demand for MD streams in different cells. It is also assumed that the designation and location of SMs and SAs has been performed a priori based on various available protocols and methods. It is further assumed that caching is being done based on similar considerations.

Figure 8:
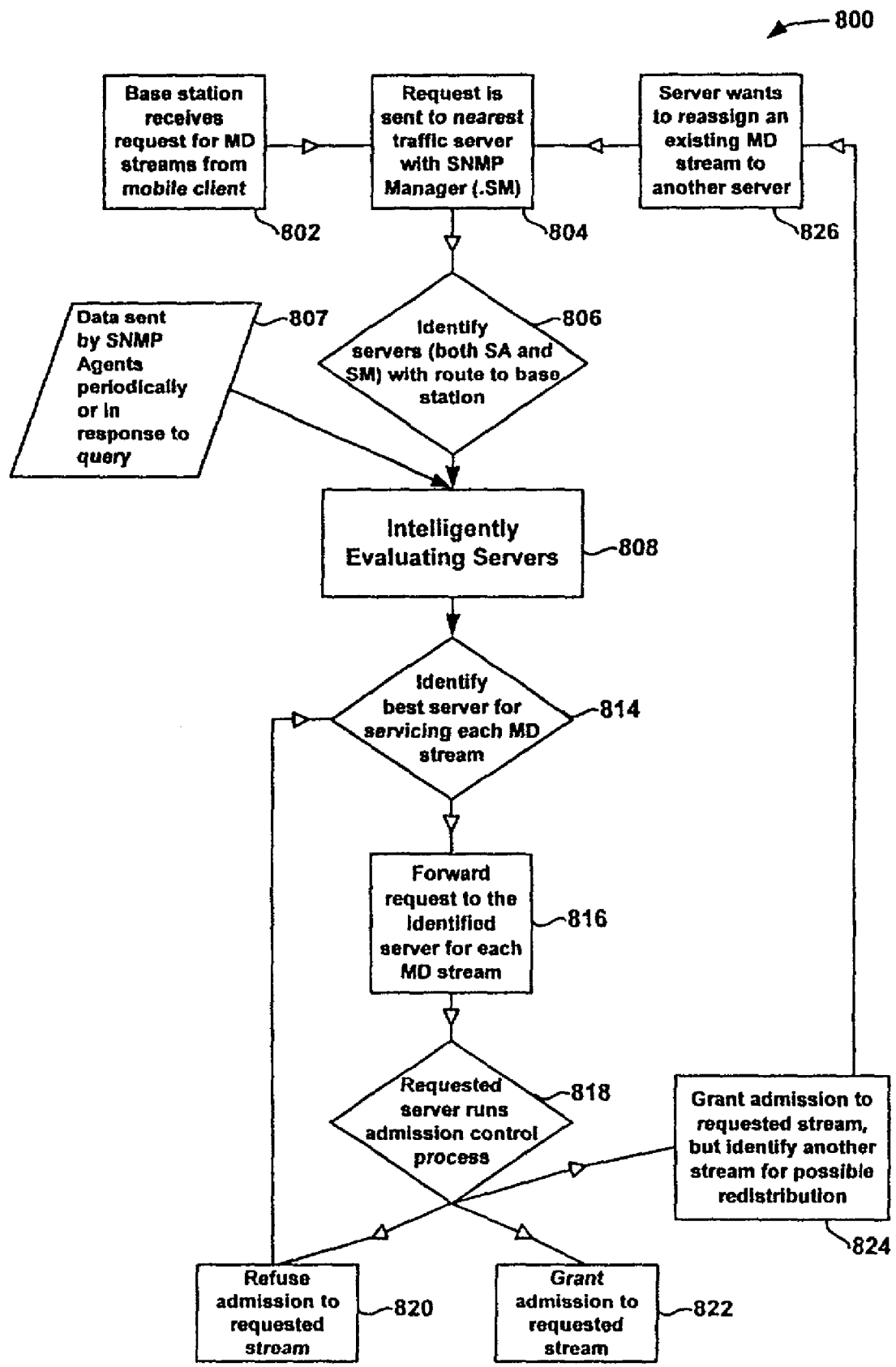
FIG. 8 is a flow chart of steps performed in accordance with one embodiment of the present claimed invention.

With reference now to FIG. 8, a flow chart 800 of steps performed in accordance with one embodiment of the present invention is shown. The methods of the present embodiment will be described in conjunction with FIG. 7A and flow chart 800 of FIG. 8. Although specific steps are disclosed in flow chart 800 of FIG. 8, such steps are exemplary. That is, the present invention is well suited to performing various other steps or variations of the steps recited in FIG. 8. Furthermore, as mentioned above in conjunction with the description of FIG. 1, portions of the present method are comprised of computer-readable and computer-executable instructions which reside, for example, in computer-usable media of a computer system. The methods of the below listed embodiments are, in some instances, comprised of computer-readable and computer-executable instructions which reside, for example, in one or more of the SMs, the SAs, the base stations, or various combinations thereof. As will be described below in detail, in the present embodiment, MD bitstreams will be provided to mobile client 706a using two servers SM 702a and SA 702b and a single base station 704a as denoted by dotted line paths 703 and 705.

At step 802, in one embodiment, a base station receives a request from a mobile client for media to be streamed to the mobile client. For purposes of illustration, the following discussion will utilize an example in which base station 704a receives a request from mobile client 706a to have media streamed thereto. The present example will further assume that the media to be streamed has been or will be encoded into two separate complimentary MD bitstreams in a manner as has been described above in detail. Furthermore, the present example also assumes that the first MD bitstream is stored at SM 702a and the second MD bitstream is stored at SA 702b. Once again, the present example is presented only for purposes of illustration of the present embodiment. That is, the present invention is well suited to the case in which: various other mobile clients request media to be streamed thereto; various other base stations receive the request for the media; and/or the requested media is encoded into other than two separate complimentary MD bitstreams stored at other than the above cited servers.

At step 804, the request for a MD stream goes to the nearest SM. In the present example, the request from mobile client 706a would be sent to SM 702a.

At step 806, the present method identifies the servers, both SMs and SAs, with a route to the base station which received the request (i.e. base station 704a in the present example). Those identified servers are considered as possible candidates to serve the MD bitstream to the mobile client. For purposes of the present example, it will be assumed that SM 702a and SA 702b, are identified as the servers with a route to base station 704a.

At step 808, the present method then intelligently evaluates the identified servers for suitability. In one embodiment of the present invention, the present method evaluates information collected via SNMP on those servers identified as possible candidates. More specifically, in one embodiment SM 702a evaluates factors such as: the computation load of identified servers 702a and 702b; network bandwidth to base station 704a for each of identified servers 702a and 702b; and the possibility of finding the requested stream in the cache for each of identified servers 702a and 702b. Importantly, although one embodiment considers computation load, network bandwidth and potential of being cached, there are various alternatives that will be possible. One of them is the application of rules obtained by datamining of access logs (i.e. rules that map factors like classification of the content requested and the daily and seasonal variations in access characteristics to the right set of servers for serving the multiple description streams). Although such evaluation steps are recited in the present embodiment, the present invention is well suited to including various other evaluation steps and/or altering the evaluation steps mentioned above.

Importantly, it should be noted that in some embodiments of the present invention, when performing the analysis to identify the appropriate servers to use (e.g. step 808), the analysis will take into account whether two separate servers as well as two separate base stations can be used. That is, in addition to conventional metrics such as computation and bandwidth loads, etc., on the servers, an additional metric employed by some embodiments of the present invention is the diversity that can be achieved. Specifically, in some embodiment, the present invention further has a goal of maximizing the diversity (e.g. desire to have two servers sending two complementary MD bitstreams over two paths to two base stations (over two wireless links) to the client). It should be pointed out, that in one embodiment of the present invention, while intelligently evaluating the servers for assigning an MD bitstream, the diversity of paths and servers selected will also be considered to increase fault tolerance.

It should be noted, that in one embodiment of the present invention, the intelligent evaluation process of step 808 is at least in part influenced by data sent by SNMP agents at step 807. In such an embodiment, the data is sent periodically or in response to a query from a SM. As mentioned above, although the present embodiment specifically mentions SNMP, such reference is intended to be exemplary and is not intended to limit the inventive concepts of the present invention. That is, the various embodiments of the present invention are well suited to the use of various network management protocols other than SNMP.

At step 814, based upon the above-described evaluation criterion, a server is identified as the best candidate for serving each of the MD streams. In the present example, SM 702a is identified as the best candidate for serving the first of the two MD bitstreams, and SA 702b is identified as the best candidate for serving the second of the two MD bitstreams. In summary, steps 806, 807, 808 and 814 of the present embodiment comprise an analyzing process for determining the best candidate from a plurality of servers to provide respective MD bitstreams to a base station.

Referring still to step 814, a distinct and significant advantage is provided here by the present invention as compared to conventional approaches. Specifically, the present invention is able to identify and subsequently employ numerous separately located servers to provide respective complementary multiple description streams of the requested media data to the mobile client. As a result, the present embodiment provides a reliable approach for delivering the requested media data to the mobile client. Furthermore, unlike conventional approaches which supply requested data from a single source, or which repeatedly duplicate the same information onto numerous sources, the present invention is able to use multiple servers to provide requested media data to the mobile client. Hence, the present invention achieves the aforementioned reliable approach with improved efficiency as compared to conventional approaches.

With reference still to step 814, still another distinct and significant advantage is provided here by the present invention as compared to conventional approaches. Specifically, the present invention provides an intrinsic path diversity advantage without requiring inefficient complete duplication of media data to be streamed to the mobile client. That is, using the above example of two MD streams, mobile client 706a has the potential of requesting and receiving both streams via two separate transmission paths. Thus, a single point of failure (e.g. a single server failure) does not prevent receipt by mobile client 706a of the streamed data.

Referring again to step 814, as will be discussed below, the present method is also well suited to an embodiment in which more than one of the plurality of MD bitstreams are provided from a single SM or SA. In one such approach, multiple base stations would be requesting the MD bitstreams, and the single server will provide the first of the MD bitstreams to the first requesting base station along a first path, and the second of the MD bitstreams to the second requesting base station along a second path.

At step 816, the present method then forwards the request to the identified best candidate. Hence, in the present example, the present method would request the first of the two MD bitstreams from SM 702a. In the present example, SA 702b would receive a request for the second of the two MD bitstreams.

At step 818, the present method causes each of the servers identified in step 814 to run an admission control process. In the present example, each of servers SM 702a and SA 702b would perform the admission control process. In the present embodiment, the outcome of the process could be any one of the three results indicated in FIG. 8. That is, each of servers SM 702a and SA 702b will either: refuse admission to the requested MD bitstream (step 820); grant admission to the requested MD bitstream (step 822); or grant admission to the requested MD bitstream, but identify another stream for possible redistribution (step 824). Steps 820, 822, and 824 are each discussed separately below.

At step 820, if the server refuses admission, the present method returns to step 814. Such a condition results in another server from the set of candidates being requested to provide admission to the MD bitstream.

At step 822, if the server grants admission to the MD bitstream, that server ultimately provides the MD bitstream for the requested media data to the mobile client. Hence, in the present example, SM 702a would provide the first of the two MD bitstreams to base station 704a, and SA 702b would provide the second of the two MD bitstreams to base station 704a.

At step 824, if the server grants admission to the MD bitstream and identifies one of its existing MD bitstreams for possible redistribution to another server, the present method proceeds to step 826. Such an outcome will occur, for example, if granting admission to the MD bitstream is possible based on average requirements of the MD bitstream, but there is significant possibility of failing to meet quality of service requirements for some MD bitstreams due to fluctuations in the bit rate. The outcome recited at step 824 may also be necessary simply because mobility patterns require occasional reassignment of MD bitstreams, and identifying these MD bitstreams when the admission control process is run is possible in the present embodiment.

Upon the completion of step 824, the present invention proceeds to step 826. At step 826, the present method then treats the server's request to reassign an existing MD bitstream to another server, in a manner similar to the approach employed when a new request from a base station is received. That is, the present embodiment proceeds to step 804 and continues from there in a manner as was described above in detail.

With reference again to FIG. 8, a flow chart 800 of steps performed in accordance with one embodiment of the present invention is shown. The methods of the present embodiment will be described in conjunction with FIG. 7B and flow chart 800 of FIG. 8. As will be described below in detail, in the present embodiment, MD bitstreams will be provided to mobile client 706a using two servers SM 702a and SA 702b and two base stations 704a and 704b as denoted by dotted line paths 707 and 709. In such an embodiment, two complementary MD bitstreams are sent from two separate servers and travel through two separate paths (specifically separate wired and separate wireless paths) and therefore there is no single point of failure. This contrasts with the case illustrated in FIG. 7A, where there were also two separate servers and two separate wired paths, but only a single wireless path.

At step 802, in one embodiment, a base station receives a request from a mobile client for media to be streamed to the mobile client. For purposes of illustration, the following discussion will utilize an example in which base station 704a receives a request from mobile client 706a to have media streamed thereto. The present example will further assume that the media to be streamed has been or will be encoded into two separate complimentary MD bitstreams in a manner as has been described above in detail. Furthermore, the present example also assumes that the first MD bitstream is stored at SM 702a and the second MD bitstream is stored at SA 702b.

At step 804, the request for a MD stream goes to the nearest SM. In the present example, the request from mobile client 706a would be sent to SM 702a.

At step 806, the present method identifies the servers, both SMs and SAs, with a route to the base station which received the request (i.e. base station 704a in the present example). Those identified servers are considered as possible candidates to serve the MD bitstream to the mobile client. For purposes of the present example, it will be assumed that SM 702a and SA 702b, are identified as the servers with a route to base station 704a. In the present embodiment, however, two base stations 704a and 704b are identified as having capability to transmit to mobile client 706a.

At step 808, the present method then intelligently evaluates the identified servers for suitability. In one embodiment of the present invention, the present method evaluates information collected via SNMP on those servers identified as possible candidates. More specifically, in one embodiment SM 702a evaluates factors such as: the computation load of identified servers 702a and 702b; network bandwidth to base stations 704a and 704b for each of identified servers 702a and 702b, respectively; and the possibility of finding the requested stream in the cache for each of identified servers 702a and 702b. Importantly, although one embodiment considers computation load, network bandwidth and potential of being cached, there are various alternatives that will be possible. One of them is the application of rules obtained by datamining of access logs (i.e. rules that map factors like classification of the content requested and the daily and seasonal variations in access characteristics to the right set of servers for serving the multiple description streams). Although such evaluation steps are recited in the present embodiment, the present invention is well suited to including various other evaluation steps and/or altering the evaluation steps mentioned above.

Importantly, it should be noted that in some embodiments of the present invention, when performing the analysis to identify the appropriate servers to use (e.g. step 808), the analysis will take into account whether two separate servers as well as two separate base stations can be used. That is, in addition to conventional metrics such as computation and bandwidth loads, etc., on the servers, an additional metric employed by some embodiments of the present invention is the diversity that can be achieved. Specifically, in some embodiment, the present invention further has a goal of maximizing the diversity (e.g. desire to have two servers sending two complementary MD bitstreams over two paths to two base stations (over two wireless links) to the client). Thus, in the present embodiment to maximize diversity (along both wired and wireless links) to mobile client 706a, two servers SA 702b and SM 702a and two base stations 704a and 704b are used to send the two MD bitstreams to mobile client 706a along two completely different paths 707 and 709.

It should be noted, that in one embodiment of the present invention, the intelligent evaluation process of step 808 is at least in part influenced by data sent by SNMP agents at step 807. In such an embodiment, the data is sent periodically or in response to a query from a SM. As mentioned above, although the present embodiment specifically mentions SNMP, such reference is intended to be exemplary and is not intended to limit the inventive concepts of the present invention. That is, the various embodiments of the present invention are well suited to the use of various network management protocols other than SNMP.

At step 814, based upon the above-described evaluation criterion, a server is identified as the best candidate for serving each of the MD streams. In the present example, SM 702a is identified as the best candidate for serving the first of the two MD bitstreams to base station 704b, and SA 702b is identified as the best candidate for serving the second of the two MD bitstreams to base station 704a. In summary, steps 806, 807, 808 and 814 of the present embodiment comprise an analyzing process for determining the best candidates from a plurality of servers to provide respective MD bitstreams to a plurality of base stations.

Referring still to step 814, a distinct and significant advantage is provided here by the present invention as compared to conventional approaches. Specifically, the present invention is able to identify and subsequently employ numerous separately located servers and base stations to provide respective complementary multiple description streams of the requested media data to the mobile client. As a result, the present embodiment provides a reliable approach for delivering the requested media data to the mobile client. Furthermore, unlike conventional approaches which supply requested data from a single source, or which repeatedly duplicate the same information onto numerous sources, the present invention is able to use multiple servers and base stations to provide requested media data to the mobile client. Hence, the present invention achieves the aforementioned reliable approach with improved efficiency as compared to conventional approaches.

With reference still to step 814, still another distinct and significant advantage is provided here by the present invention as compared to conventional approaches. Specifically, the present invention provides an intrinsic path diversity advantage without requiring inefficient complete duplication of media data to be streamed to the mobile client. That is, using the above example of two MD streams, mobile client 706a has the potential of requesting and receiving both streams via two completely separate transmission paths 707 and 709. Thus, a single point of failure (e.g. a single server failure or single base station failure) does not prevent receipt by mobile client 706a of the streamed data.

Referring again to step 814, as will be discussed below, the present method is also well suited to an embodiment in which more than one of the plurality of MD bitstreams are provided from a single SM or SA. In one such approach, multiple base stations would be requesting the MD bitstreams, and the single server will provide the first of the MD bitstreams to the first requesting base station along a first path, and the second of the MD bitstreams to the second requesting base station along a second path.

At step 816, the present method then forwards the request to the identified best candidate. Hence, in the present example, the present method would request the first of the two MD bitstreams from SM 702a. In the present example, SA 702b would receive a request for the second of the two MD bitstreams.

At step 818, the present method causes each of the servers identified in step 814 to run an admission control process. In the present example, each of servers SM 702a and SA 702b would perform the admission control process. In the present embodiment, the outcome of the process could be any one of the three results indicated in FIG. 8. That is, each of servers SM 702a and SA 702b will either: refuse admission to the requested MD bitstream (step 820); grant admission to the requested MD bitstream (step 822); or grant admission to the requested MD bitstream, but identify another stream for possible redistribution (step 824). Steps 820, 822, and 824 are each discussed separately below.

At step 820, if the server refuses admission, the present method returns to step 814. Such a condition results in another server from the set of candidates being requested to provide admission to the MD bitstream.

At step 822, if the server grants admission to the MD bitstream, that server ultimately provides the MD bitstream for the requested media data to the mobile client. Hence, in the present example, SM 702a would provide the first of the two MD bitstreams to base station 704b, and SA 702b would provide the second of the two MD bitstreams to base station 704a.

At step 824, if the server grants admission to the MD bitstream and identifies one of its existing MD bitstreams for possible redistribution to another server, the present method proceeds to step 826. Such an outcome will occur, for example, if granting admission to the MD bitstream is possible based on average requirements of the MD bitstream, but there is significant possibility of failing to meet quality of service requirements for some MD bitstreams due to fluctuations in the bit rate. The outcome recited at step 824 may also be necessary simply because mobility patterns require occasional reassignment of MD bitstreams, and identifying these MD bitstreams when the admission control process is run is possible in the present embodiment.

Upon the completion of step 824, the present invention proceeds to step 826. At step 826, the present method then treats the server's request to reassign an existing MD bitstream to another server, in a manner similar to the approach employed when a new request from a base station is received. That is, the present embodiment proceeds to step 804 and continues from there in a manner as was described above in detail.

With reference again to FIG. 8, a flow chart 800 of steps performed in accordance with one embodiment of the present invention is shown. The methods of the present embodiment will be described in conjunction with FIG. 7C and flow chart 800 of FIG. 8. As will be described below in detail, in the present embodiment, MD bitstreams will be provided to mobile client 706a using one server SM 702a and two base stations 704a and 704b as denoted by dotted line paths 711 and 713. In such an embodiment, two complementary MD bitstreams are sent from a single server and travel through two separate paths (specifically separate wired and separate wireless paths). This contrasts with the case illustrated in FIG. 7A, where there were also two separate servers and two separate wired paths, but only a single wireless path, and with the case illustrated in FIG. 7B where there were also two separate servers and two separate base stations.

At step 802, in one embodiment, a base station receives a request from a mobile client for media to be streamed to the mobile client. For purposes of illustration, the following discussion will utilize an example in which base station 704a receives a request from mobile client 706a to have media streamed thereto. The present example will further assume that the media to be streamed has been or will be encoded into two separate complimentary MD bitstreams in a manner as has been described above in detail. Furthermore, the present example also assumes that the first MD bitstream and the second MD bitstream is stored at SM 702a.

At step 804, the request for a MD stream goes to the nearest SM. In the present example, the request from mobile client 706a would be sent to SM 702a.

At step 806, the present method identifies the servers, both SMs and SAs, with a route to the base station which received the request (i.e. base station 704a in the present example). Those identified servers are considered as possible candidates to serve the MD bitstream to the mobile client. For purposes of the present example, it will be assumed that SM 702a and SA 702b, are identified as the servers with a route to base station 704a but that only SM 702a is to be used. In the present embodiment, however, two base stations 704a and 704b are identified as having capability to transmit to mobile client 706a.

At step 808, the present method then intelligently evaluates single server 702a for suitability. In one embodiment of the present invention, the present method evaluates information collected via SNMP on those servers identified as possible candidates. More specifically, in one embodiment SM 702a evaluates factors such as: the computation load of identified server 702a; network bandwidth to base stations 704a and 704b for identified server 702a, respectively; and the possibility of finding the requested stream in the cache for identified server 702a. Importantly, although one embodiment considers computation load, network bandwidth and potential of being cached, there are various alternatives that will be possible. One of them is the application of rules obtained by datamining of access logs (i.e. rules that map factors like classification of the content requested and the daily and seasonal variations in access characteristics to the right server for serving the multiple description streams). Although such evaluation steps are recited in the present embodiment, the present invention is well suited to including various other evaluation steps and/or altering the evaluation steps mentioned above.

Importantly, it should be noted that in some embodiments of the present invention, when performing the analysis to identify the appropriate server to use (e.g. step 808), the analysis will take into account whether two separate base stations can be used. That is, in addition to conventional metrics such as computation and bandwidth loads, etc., on the server, an additional metric employed by some embodiments of the present invention is the diversity that can be achieved. Specifically, in some embodiment, the present invention further has a goal of maximizing the diversity (e.g. desire to have the single server send two complementary MD bitstreams over two paths to two base stations (over two wireless links) to the client). Thus, in the present embodiment to maximize diversity (along both wired and wireless links) to mobile client 706a, two base stations 704a and 704b are used to send respective ones of the MD bitstreams to mobile client 706a along two completely different paths 711 and 713.

It should be noted, that in one embodiment of the present invention, the intelligent evaluation process of step 808 is at least in part influenced by data sent by SNMP agents at step 807. In such an embodiment, the data is sent periodically or in response to a query from a SM. As mentioned above, although the present embodiment specifically mentions SNMP, such reference is intended to be exemplary and is not intended to limit the inventive concepts of the present invention. That is, the various embodiments of the present invention are well suited to the use of various network management protocols other than SNMP.

At step 814, based upon the above-described evaluation criterion, a server, SM 702a, is identified as the best candidate for serving the first of the two MD bitstreams to base station 704a and the second of the two MD bitstreams to base station 704b. In summary, steps 806, 807, 808 and 814 of the present embodiment comprise an analyzing process for determining the best candidate from a plurality of servers to provide MD bitstreams to a plurality of base stations.

Referring still to step 814, a distinct and significant advantage is provided here by the present invention as compared to conventional approaches. Specifically, the present invention is able to identify and subsequently employ numerous separately located base stations to provide respective complementary multiple description streams of the requested media data to the mobile client. As a result, the present embodiment provides a reliable approach for delivering the requested media data to the mobile client. Furthermore, unlike conventional approaches which supply requested data from a single source via a single path, or which repeatedly duplicate the same information onto numerous sources, the present invention is able to use multiple base stations to provide requested media data to the mobile client. Hence, the present invention achieves the aforementioned reliable approach with improved efficiency as compared to conventional approaches.

With reference still to step 814, still another distinct and significant advantage is provided here by the present invention as compared to conventional approaches. Specifically, the present invention provides an intrinsic path diversity advantage without requiring inefficient complete duplication of media data to be streamed to the mobile client. That is, using the above example of two MD streams, mobile client 706a has the potential of requesting and receiving both streams via two completely separate transmission paths 711 and 713. Thus, a single point of failure (e.g. a single base station failure) does not prevent receipt by mobile client 706a of the streamed data.

At step 816, the present method then forwards the request to the identified best candidate. Hence, in the present example, the present method would request both of the two MD bitstreams from SM 702a.

At step 818, the present method causes the server identified in step 814 (SM 702a) to run an admission control process. In the present embodiment, the outcome of the process could be any one of the three results indicated in FIG. 8. That is, server SM 702a will either: refuse admission to the requested MD bitstream (step 820); grant admission to the requested MD bitstream (step 822); or grant admission to the requested MD bitstream, but identify another stream for possible redistribution (step 824). Steps 820, 822, and 824 are each discussed separately below.

At step 820, if the server refuses admission, the present method returns to step 814. Such a condition results in another server from the set of candidates being requested to provide admission to the MD bitstream.

At step 822, if the server grants admission to the MD bitstream, that server ultimately provides the MD bitstream for the requested media data to the mobile client. Hence, in the present example, SM 702a would provide the first of the two MD bitstreams to base station 704a and the second of the two MD bitstreams to base station 704b.

At step 824, if the server grants admission to the MD bitstream and identifies one of its existing MD bitstreams for possible redistribution to another server, the present method proceeds to step 826. Such an outcome will occur, for example, if granting admission to the MD bitstream is possible based on average requirements of the MD bitstream, but there is significant possibility of failing to meet quality of service requirements for some MD bitstreams due to fluctuations in the bit rate. The outcome recited at step 824 may also be necessary simply because mobility patterns require occasional reassignment of MD bitstreams, and identifying these MD bitstreams when the admission control process is run is possible in the present embodiment.

Upon the completion of step 824, the present invention proceeds to step 826. At step 826, the present method then treats the server's request to reassign an existing MD bitstream to another server, in a manner similar to the approach employed when a new request from a base station is received. That is, the present embodiment proceeds to step 804 and continues from there in a manner as was described above in detail.

WIRELESS COMMUNICATION BETWEEN WIRELESS BASE STATIONS AND MOBILE CLIENTS: WIRELESS CELL HANDOFFS

The following discussion pertains to methods of the present invention dealing with handing off of streaming media sessions between base stations of a wireless communication system. Specifically, such handing off typically occurs, for example, when the client changes location during a streaming session (i.e. the mobile client moves between different wireless cells). Such handing off may also occur, however, when, for any number of reasons, a different base station is assigned to handle the streaming media session with the mobile client. When such conditions occur, a smooth wireless handoff must be performed. That is, the first base station must "handoff" the media streaming session to the second base station. Handoff of a streaming session is generally performed with either a "soft" or a "hard" handoff technique. In a soft-handoff approach, the mobile client may communicate concurrently with both the first and the second base station as handoff process occurs. In a hard-handoff approach, the mobile client can communicate with only one or the other of the first and the second base stations as handoff process occurs. The following discussion, will cover methods of the present invention applicable to a soft-handoff approach and methods of the present invention applicable to a hard-handoff approach.

Soft-handoff is supported in some wireless communication systems, such as the code division multiple access (CDMA) based IS-95, by allowing a mobile client to simultaneously communicate with multiple base stations. The basic mechanism of a traditional soft-handoff system is outlined below in conjunction with Prior Art FIG. 9. One advantage of soft-handoff systems is the ability to maintain communication at all times with the base station with the strongest signal strength. This advantage is particularly beneficial for systems where power control is used. However, one penalty associated with conventional soft-handoff approaches is the need to transmit multiple copies of the same data to the mobile client, thereby wasting scarce network resources.

Figure 9:
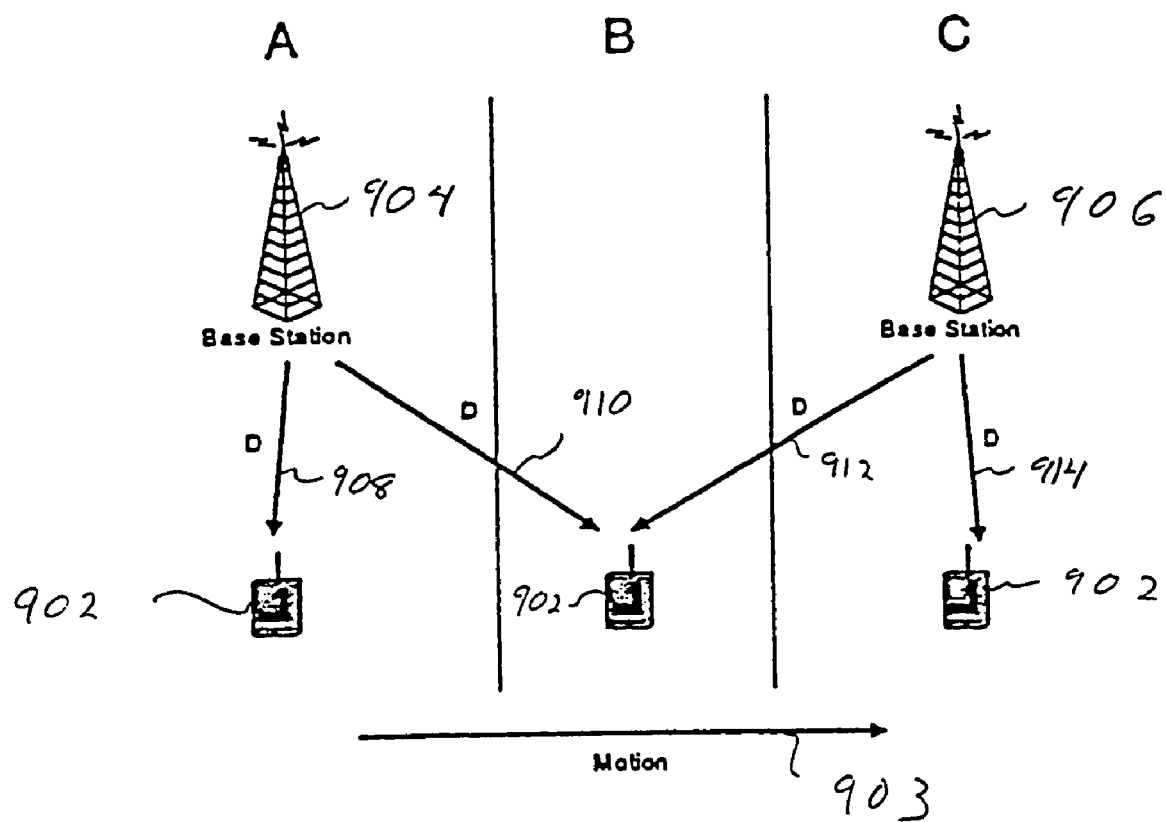
FIG. 9 is a diagram depicting a conventional soft handoff approach.

As depicted in Prior Art FIG. 9, a mobile client 902 is shown moving in a direction as indicated by motion arrow 903. More particularly, Prior Art FIG. 9 depicts mobile client 902 moving across three separate regions, A, B, and C. Base station 904 is located in region A, and base station 906 is located in region C. No base station is present in region B. It should further be pointed out that in a conventional wireless system, single-stream video compression techniques are employed to produce a single, high bit-rate, stream of data, D. Communication channels/links are schematically depicted by arrows 908, 910, 912, and 914.

In the conventional soft-handoff approach depicted in Prior Art FIG. 9, mobile client 902 continuously monitors the channel quality (such as, for example, signal strength) from each base station and maintains an active set of base stations with which it is communicating. As background, typically, a base station which is not in the active set is added when the channel quality is above an add threshold value. Conversely, a base station which is in the active set is dropped when the channel quality drops below a drop threshold value.

With reference again to Prior Art FIG. 9, in this depiction of a conventional soft-handoff approach, initially, mobile client 902 is in region A, and only channel 908 between base station 904 and mobile client 902 is good enough to be useful. Thus, in the present depiction, when in region A, mobile client 902 communicates exclusively with base station 904 as depicted by arrow 908. As mobile client 902 moves away from base station 904 and towards base station 906, the channel quality to base station 904 and base station 906 decreases and increases, respectively. When in region B, simultaneous communication between both base stations 904 and 906 and mobile client 902 is established as represented by arrows 910 and 912. In such an instance, two copies of data, one from base station 904 and another from base station 906, are sent to mobile client 902. That is, an identical copy of the data, D, is sent from each of base stations 904 and 906 in the active set to mobile client 902. Under such circumstances, mobile client 902 chooses the best copy of the data, D, that is received. The "least best" of the two copies of the data, D, is discarded by mobile client 902. Finally, as mobile client 902 moves into region C and farther away from base station 904, the channel quality from base station 904 drops below the drop threshold value, and mobile client 902 communicates only with base station 906 as depicted by arrow 914.

Such a conventional soft-handoff approach suffers from severe inefficiency. More specifically, if each of base stations 904 and 906 are transmitting data, D, at a rate of N bits per second, when in region B for example, mobile client 902 is receiving data, D, at a rate of approximately 2N bits per second. That is, mobile client 902 is receiving data, D, at a rate of approximately N bits per second from base station 904 and mobile client 902 is also receiving another copy of the same data, D, at a rate of approximately N bits per second from base station 906. Mobile client 902 must then wastefully discard the superfluous received data, D. This inefficiency associated with conventional soft-handoff approaches is further compounded by the fact that mobile clients are very often located in a region (e.g. region B of Prior Art FIG. 9) in which communication with two base stations is occurring. Hence, actual "real world" conditions provide ample opportunity for waste associated with conventional soft-handoff approaches. As will be described in detail below, various embodiments of the present invention eliminate the severe inefficiency associated with conventional soft-handoff approaches. That is, the present embodiment provides a method employing multiple-description coding to alleviate the problem of excessive bandwidth usage.

Figure 10:
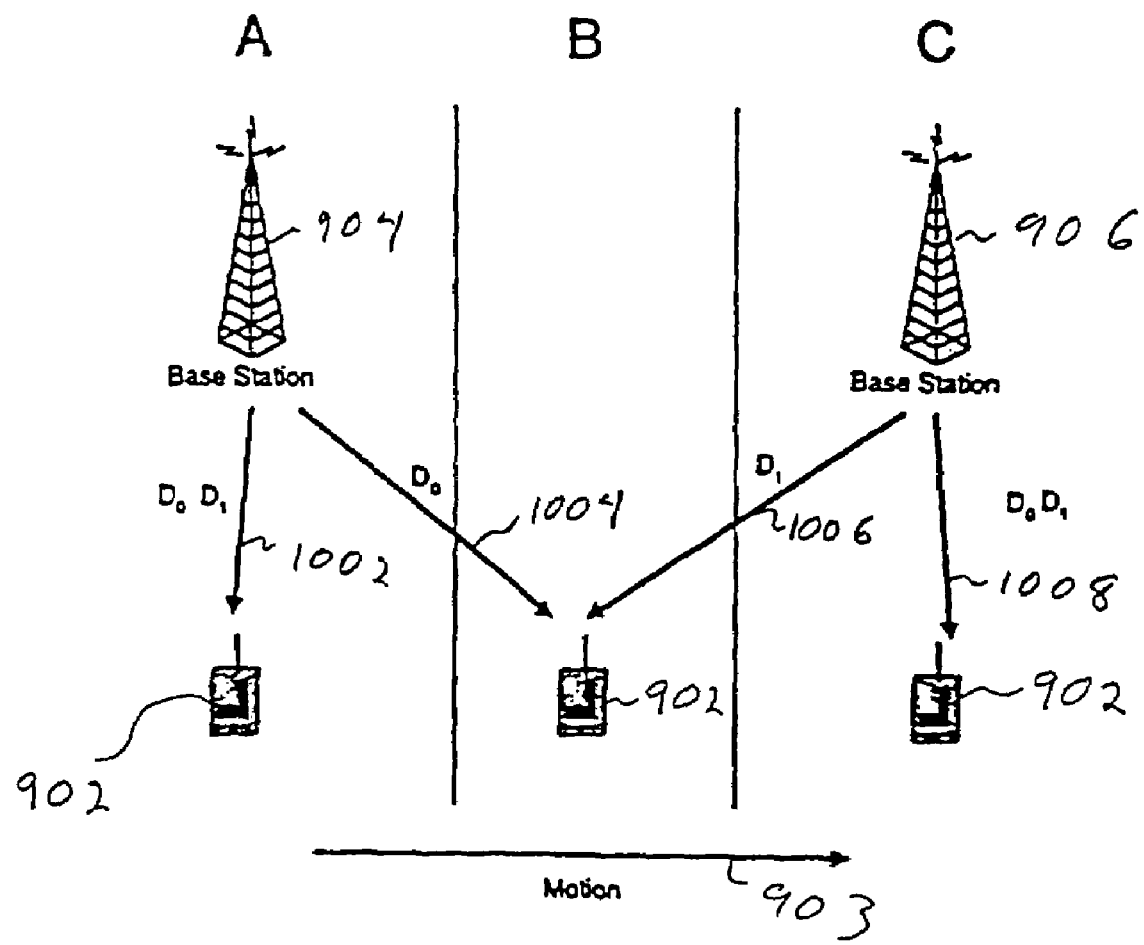
FIG. 10 is a diagram depicting a soft handoff approach performed in accordance with various embodiments of the present claimed invention.

With reference now to FIG. 10, a diagram depicting a soft handoff approach performed in accordance with various embodiments of the present claimed invention is shown. In FIG. 10, a mobile client 902 is shown moving in a direction as indicated by motion arrow 903. More particularly, FIG. 10 depicts mobile client 902 moving across three separate regions, A, B, and C. Base station 904 is located in region A, and base station 906 is located in region C. No base station is present in region B. In the present embodiment, the following example will further assume that the media to be streamed (e.g. a video stream) has been or will be encoded into two separate complimentary MD bitstreams, $D_0$ and $D_1$, whose combined data-rate is close to that of D, of FIG. 9. Such MD coding to provide multiple description bitstreams has been described above in detail. Furthermore, the present example also assumes that both the first MD bitstream, $D_0$, and the second MD bitstream, $D_1$, are each stored both at base station 904 and base station 906. Once again, the present example is presented only for purposes of illustration of the present embodiment. That is, the present invention is well suited to the case in which the requested media is encoded into other than two separate complimentary MD bitstreams, and/or that both the first MD bitstream, $D_0$, and the second MD bitstream, $D_1$, are not each stored both at base station 904 and base station 906. Hence, unlike a conventional wireless system, the present method does not employ only a single stream of data. Additionally, communication channels/links are schematically depicted by arrows 1002, 1004, 1006, and 1008. For purposes of clarity, in the present example, it is illustrated that mobile client 902 simultaneously communicates with only two base stations. In general, the claimed invention can be applied to soft hand-off scenarios with more than two base-stations.

With reference again to FIG. 10, in the present example, initially, mobile client 902 is in region A, and only channel 1002 between base station 904 and mobile client 902 is good enough to be useful. Thus, in the present depiction, when in region A, mobile client 902 communicates exclusively with base station 904 as depicted by arrow 1002. In the present example, because both the first MD bitstream, $D_0$, and the second MD bitstream, $D_1$, are each stored at base station 904, either or both of the first and second MD bitstreams $D_0$ and $D_1$ can be transmitted to mobile client 902. In a case where only one of the two MD bitstreams is stored at base station 904, only that one MD bitstream will be transmitted to mobile client 902. Also, the present method is well suited to an embodiment in which only one of the two MD bitstreams are transmitted to mobile client 902 in region A, even though both the first MD bitstream, $D_0$, and the second MD bitstream, $D_1$, are stored at base station 904.

Referring again to FIG. 10, as mobile client 902 moves away from base station 904 and towards base station 906, the channel quality to base station 904 and base station 906 decreases and increases, respectively. When in region B, the channel quality between mobile client 902 and base station 906 rises above the add-threshold. As a result, simultaneous communication between both base stations 904 and 906 and mobile client 902 is established as represented by arrows 1004 and 1006. Thus, in the present embodiment, when communicating with both base station 904 and base station 906, mobile client 902 obtains one description from each base station. According to one embodiment of the present invention, mobile client 902 then combines both received descriptions to obtain better video quality than is available using only one of the two descriptions. Hence, the present embodiment eliminates the need to send two identical copies of the same data (one from base station 904 and another from base station 906) to mobile client 902. As a result, the present method does not receive, nor have the need to discard, superfluous data. Also, in a case where only one of the two MD bitstreams (e.g. MD bitstream D0) is stored at base station 904, and the other of the two MD bitstreams (e.g. MD bitstream D1) is stored at base station 906, mobile client 902 will receive MD bitstream D0 from base station 904 and MD bitstream D1 from base station 906.

Additionally, because, in region B, mobile client 902 is receiving only one of the two MD bitstreams from each of base stations 904 and 906, mobile client 902 is not receiving data at twice the normal data rate (i.e. the data rate at which mobile client 902 typically receives both MD bitstreams when in either region A or region C). More specifically, when base stations 904 and 906 are each transmitting only one of the two MD bitstreams, mobile client 902 is receiving data, D, at a rate which is approximately the same as the typical rate at which mobile client 902 receives data when in region A or region C. This is to be contrasted with conventional soft-handoff approaches (such as the approach depicted in Prior Art FIG. 9) in which the mobile client, when in region B, receives data at a rate which is approximately twice the typical rate at which mobile client receives data when in region A or region C. Such bandwidth savings (approximately 2:1 over conventional soft-handoff approaches) are increasingly important and valuable as wireless channels become more and more crowded. Thus, in addition to eliminating (1) the wasteful use of precious wireless spectrum and (2) the need to wastefully discard superfluous data, the present method also provides a more consistent data rate for the mobile client.

Next, as mobile client 902 moves into region C and farther away from base station 904, the channel quality from base station 904 drops below the drop threshold value, and mobile client 902 communicates only with base station 906 as depicted by arrow 1008. When in region C, mobile client 902 communicates exclusively with base station 906 as depicted by arrow 1008. In the present example, because both the first MD bitstream, $D_0$, and the second MD bitstream, $D_1$, are each stored at base station 906, either or both of the first and second MD bitstreams $D_0$ and $D_1$ can be transmitted to mobile client 902. In a case where only one of the two MD bitstreams is stored at base station 906, only that one MD bitstream will be transmitted to mobile client 902. Also, the present method is well suited to an embodiment in which only one of the two MD bitstreams are transmitted to mobile client 902 in region C, even though both the first MD bitstream, $D_0$, and the second MD bitstream, $D_1$, are stored at base station 906.

Figure 11:
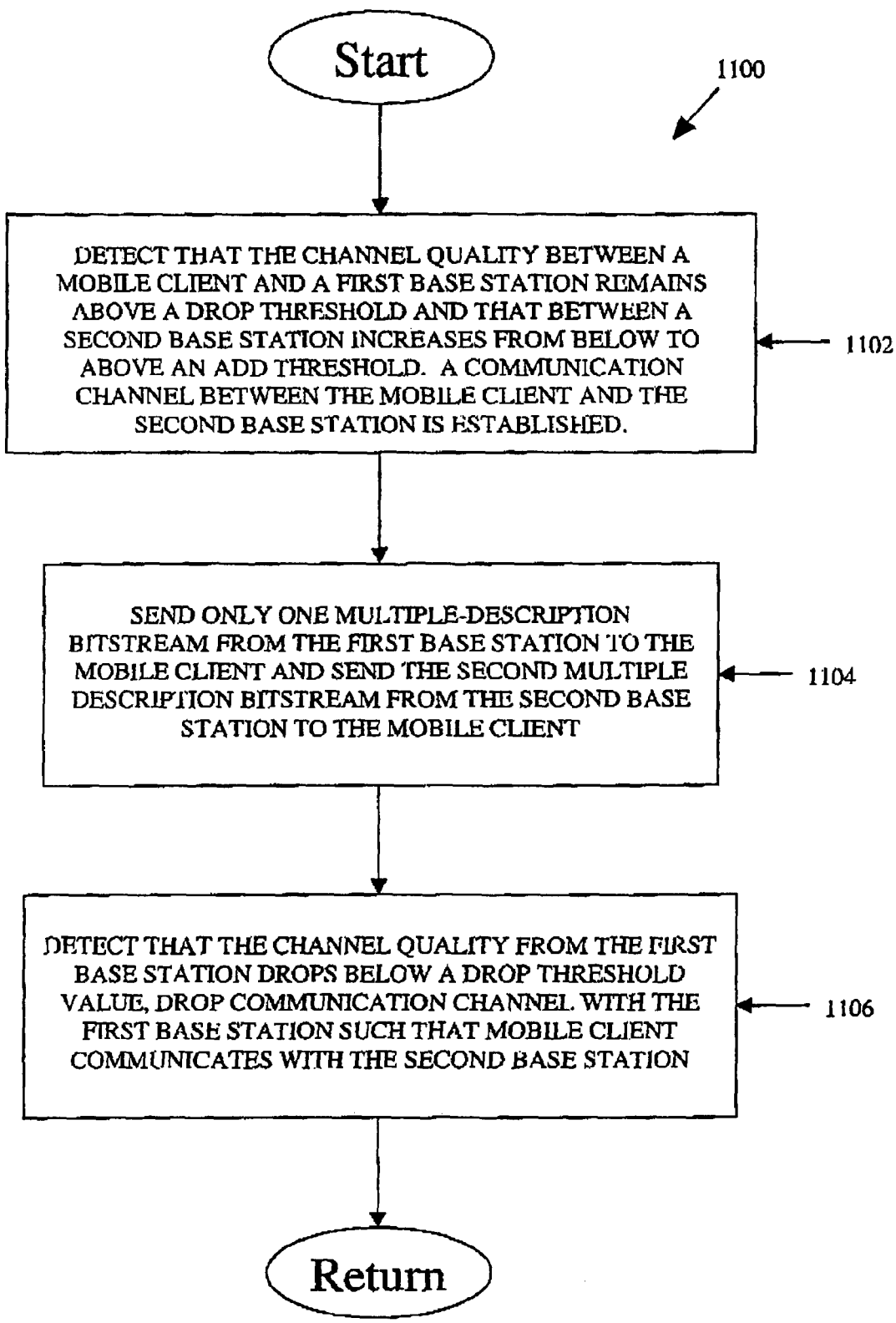
FIG. 11 is a flow chart of steps performed in accordance with one embodiment of the present claimed invention.

With reference now to FIG. 11, a flow chart 1100 of steps performed in the present embodiment are recited. Although specific steps are disclosed in flow chart 1100 of FIG. 11, such steps are exemplary. That is, the present invention is well suited to performing various other steps or variations of the steps recited in FIG. 11. Furthermore, as mentioned above in conjunction with the description of FIG. 1, portions of the present method are comprised of computer-readable and computer-executable instructions which reside, for example, in computer-usable media of a computer system. The methods of the below listed embodiments are, in some instances, comprised of computer-readable and computer-executable instructions which reside, for example, in a network device such as one or more of the first and second base stations. At step 1102, the present method detects that the channel quality between a mobile client (e.g. mobile client 902) and a first base station (e.g. first base station 904) and a second base station (e.g. base station 906) continually decreases and increases, respectively until the channel quality between the mobile client and the second base station is above an add threshold. Under that condition, a communication channel is established between the mobile client and the second base station so that the mobile client can simultaneously communicate with both the first base station and the second base station. In one embodiment, the first base station has stored therein and is transmitting to the mobile client, both the first MD bitstream and the second MD bitstream. At this time, the channel quality from the first base station is above the drop threshold value and the channel quality from the second base station is approaching the add threshold value. Additionally, both the first base station and the second base station are in the active set for the mobile client.

At step 1104, the present embodiment sends the first MD bitstream (e.g. MD bitstream D0) from the first base station to mobile client 902, and sends the second MD bitstream (e.g. MD bitstream D1) from the second base station to mobile client 902. At this time, the channel quality from the first base station is above the drop threshold value and the channel quality from the second base station is at or above the add threshold value. In one embodiment, the first base station has stored therein both the first MD bitstream and the second MD bitstream, and the second base station has stored therein both the first MD bitstream and the second MD bitstream. The present invention is well suited, however, to embodiments in which both of the MD bitstreams are not each stored at the first base station and the second base station.

At step 1106, the present embodiment detects that the channel quality from the first base station drops below the drop threshold value. As such, the communication channel with the first base station is dropped and the mobile client communicates primarily with the second base station. In one embodiment, the second base station has stored therein and is now transmitting to the mobile client, both the first MD bitstream and the second MD bitstream.

Figure 12:
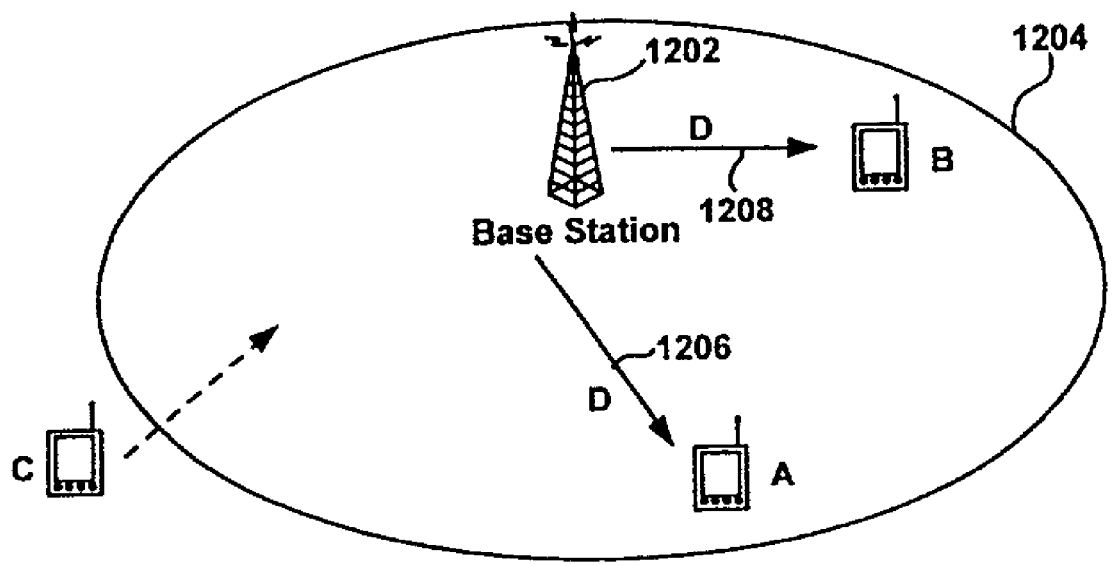
FIG. 12 is a diagram depicting utilization drawbacks associated with a conventional hard handoff approach.

With reference now to Prior Art FIG. 12, a diagram depicting utilization drawbacks associated with a conventional hard handoff approach is shown. Prior Art FIG. 12 includes three mobile clients A, B, and C, and a base station 1202 all within a common cell 1204. It should further be pointed out, again, that in a conventional wireless system a single-stream video compression techniques are employed to produce a single stream of data, D. Communication channels/links are schematically depicted by arrows 1206 and 1208. The aforementioned soft-handoff is typically implemented only in CDMA systems. In other wireless systems, such as, for example, the Global System for Messaging (GSM), a mobile client can typically send and receive data only from one base station at any given time. Additionally, there are a fixed number of channels each base station can use. In a conventional hard-handoff approach, where one video stream is used, streaming has to be terminated if the new base station does not have enough capacity to carry the stream.

Referring still to Prior Art FIG. 12, the case where a base station, e.g. base station 1202, has just enough capacity to serve single-stream video, D, to two mobile clients, A and B, is illustrated. In this example of the conventional approach, a mobile client, C, moves towards cell 1204 serviced by base station 1202. In order for mobile client C to be serviced by base station 1202, base station 1202 must drop at least one of mobile clients A and B. That is, communication channel 1208 or communication channel 1206 will have to be dropped to free up a communication channel for use by mobile client C. If it is assumed that mobile client C is being serviced by another base station, not shown, and that other base station's signal becomes so weak as to be dropped, mobile client C must either be immediately serviced by base station 1202 or mobile client C's service will be interrupted. Thus, in a conventional hard-handoff approach in order to accommodate the arrival of a new mobile client (e.g. mobile client C), service to an existing mobile client or service to the new mobile client may be severely disrupted.

Figure 13A:
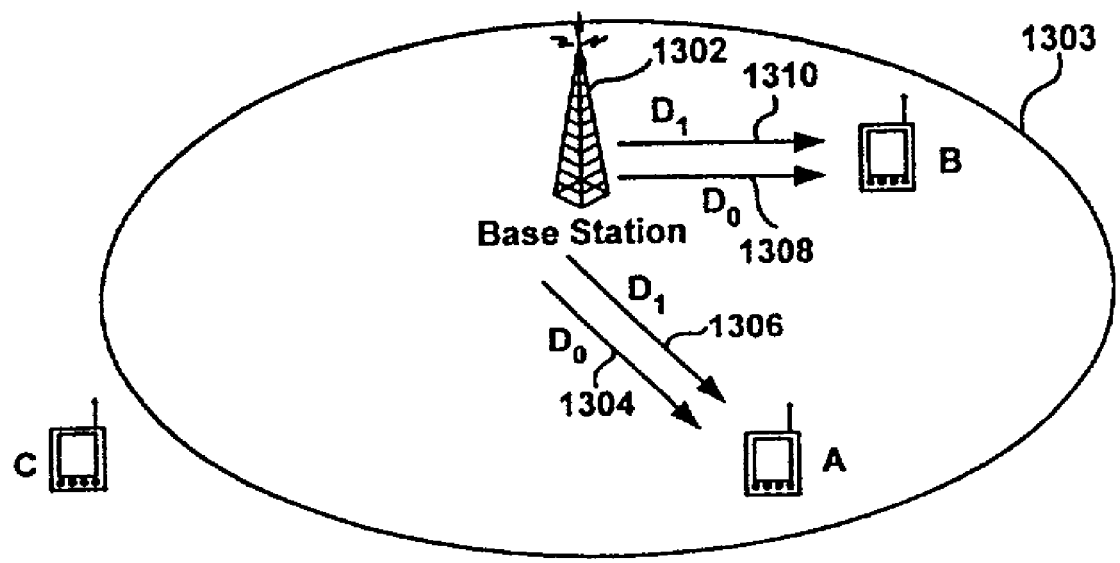
FIGS. 13A–13B are diagrams depicting utilization improvements achieved in accordance with various embodiments of the present claimed invention.
Figure 13B:
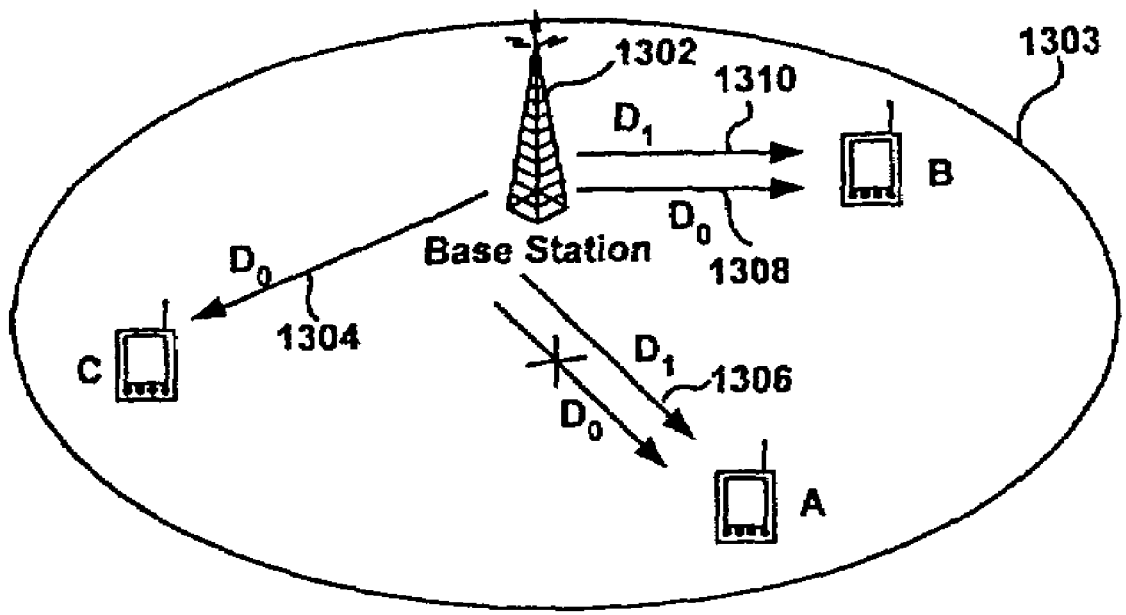

With reference now to FIGS. 13A and 13B, diagrams depicting utilization improvements achieved in accordance with various embodiments of the present method are shown. FIGS. 13A and 13B each include three mobile clients A, B, and C, and a base station 1302 all within a common cell 1303. Communication channels/links are schematically depicted by arrows 1304, 1306, 1308, and 1310. In the present embodiment, the following example will further assume that the media to be streamed (e.g. a video stream) has been or will be encoded into two separate complimentary MD bitstreams, D0 and D1, whose combined data-rate is close to that of D of FIG. 12. Such MD coding to provide multiple description bitstreams has been described above in detail. Specifically, in the present embodiment, base station 1302 is transmitting the first MD bitstream, D0, to mobile client A using channel 1304, and base station 1302 is transmitting the second MD bitstream, D1, to mobile client A using channel 1306. Similarly, base station 1302 is transmitting the first MD bitstream, D0, to mobile client B using channel 1308, and base station 1302 is transmitting the second MD bitstream, D1, to mobile client B using channel 1310. Once again, the present example is presented only for purposes of illustration of the present embodiment. That is, the present invention is well suited to the case in which the requested media is encoded into other than two separate complimentary MD bitstreams. Hence, unlike a conventional wireless system, the present method does not employ only a single stream of data. Additionally, in FIG. 13A, it is assumed that base station 1302, has just enough capacity to provide the first and second MD bitstreams to each of the two mobile clients, A and B.

With reference now to FIGS. 13A and 13B, mobile client C, which is located outside of cell 1303 in FIG. 13A, travels into cell 1303. In the present embodiment, mobile client C, has now traveled towards base station 1302 from another cell, not shown, and desires service from base station 1302. In the present embodiment, instead of denying service to mobile client C, and thereby cause service disruption, base station 1302 ceases sending one of the MD bitstreams (e.g. first MD bitstream $D_0$) to one of its existing mobile clients (e.g. mobile client A). Base station 1302 then uses the spare capacity (see e.g. channel 1304) to provide service to mobile client C. Because the present embodiment employs MD coding, mobile client A remains serviced and mobile client C is now newly serviced even though both clients receive only one MD bitstream. Hence, the highly objectionable disruption of service is eliminated for mobile unit C and A or B. Therefore, the present method reduces the probability of undesirable service disruption during hard-handoffs. Furthermore, in an instance where base station 1302 has sufficient capacity, base station 1302 is able to provide one or both of the two separate complimentary MD bitstreams, $D_0$ and $D_1$ to new mobile client. Additionally, in one embodiment, base station 1302 can reallocate more than one of the two separate complimentary MD bitstreams, $D_0$ and $D_1$ to new mobile client C.

With reference still to FIG. 13A, in the present embodiment, service disruption will not occur as long as the base station has enough capacity to provide one MD bitstream to the incoming mobile client. Furthermore, even when there is no free capacity available in the base station, extra capacity can be created by reducing the number of MD bitstreams being served to existing mobile units, and reallocating one of the MD bitstreams to the newly arriving mobile client. It can be seen that the present method can support nearly twice the number of calls than is available under conventional hard-handoff approaches, assuming two descriptions are used for multiple description coding. The maximum number of users that can be supported increases as the number of descriptions used in multiple description coding increases. For example, if the base station can normally support N users with K descriptions per user, then it can support a range of possible users, from up to N users at a maximum quality for each user (K descriptions each) to N*K users at a usable quality per user (1 description each). In this manner, the system provides a form of graceful degradation as it can vary its operation from providing the maximum quality per user to supporting the maximum number of users (at a lower quality per user) as the demand increases.

In addition, while the above discussion focuses on the benefits to hard-handoff approaches, the benefits may also be achieved in soft-handoff approaches.

Figure 14:
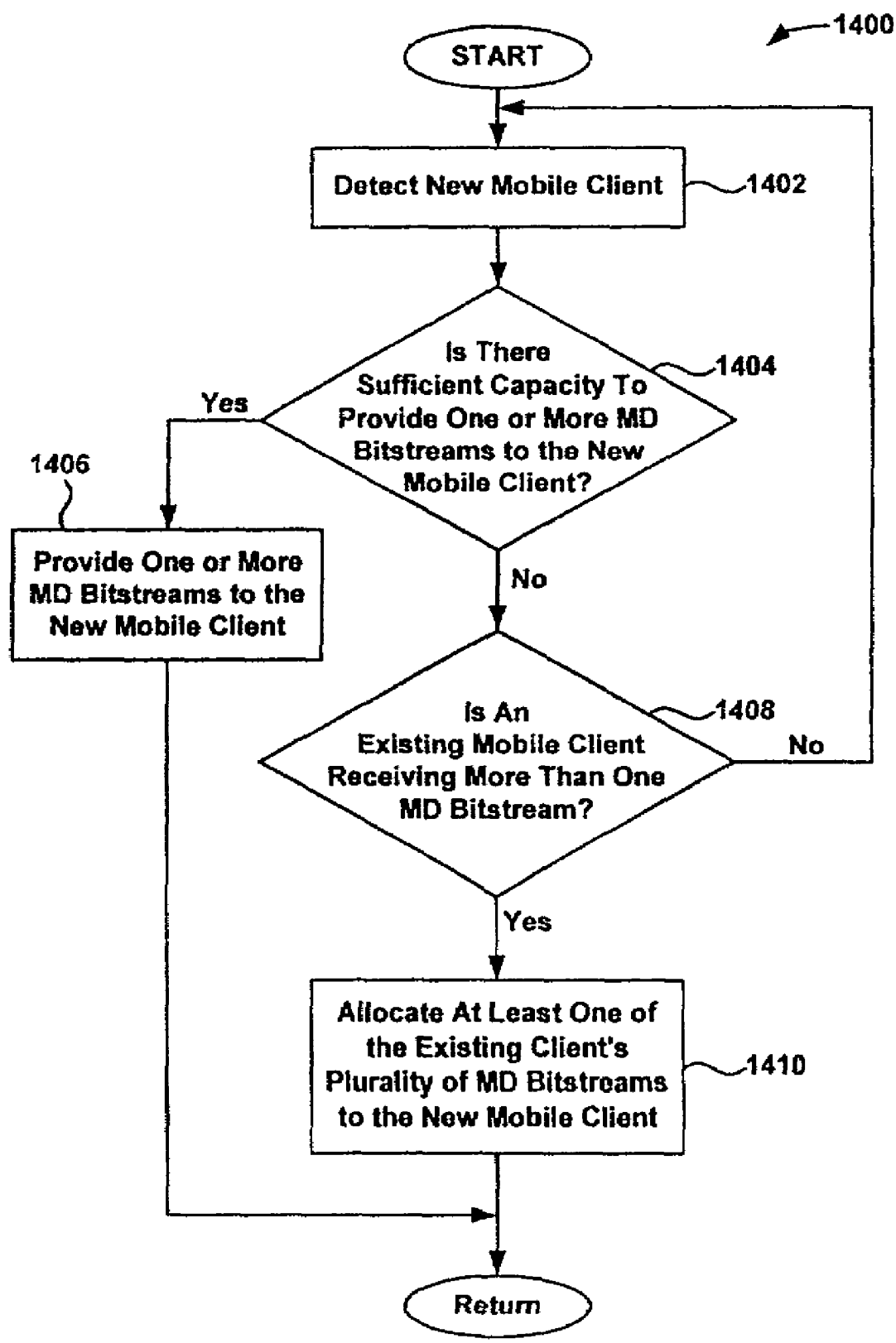
FIG. 14 is a flow chart of steps performed in accordance with one embodiment of the present claimed invention.

With reference now to FIG. 14, a flow chart 1400 of steps performed in the present embodiment are recited. Although specific steps are disclosed in flow chart 1400 of FIG. 14, such steps are exemplary. That is, the present invention is well suited to performing various other steps or variations of the steps recited in FIG. 14. Furthermore, as mentioned above in conjunction with the description of FIG. 1, portions of the present method are comprised of computer-readable and computer-executable instructions which reside, for example, in computer-usable media of a computer system. The methods of the below listed embodiments are, in some instances, comprised of computer-readable and computer-executable instructions which reside, for example, in a network device such as one or more base stations. At step 1402, the present embodiment detects a mobile client seeking to establish a communication channel with a base station.

At step 1404, the present embodiment determines if the base station has sufficient capacity to provide one or more of a plurality of MD bitstreams to the new mobile client. If the base station does have sufficient capacity to provide one or more of a plurality of MD bitstreams to the new mobile client, the present method proceeds to step 1406. If the base station does not have sufficient capacity to provide one or more of a plurality of MD bitstreams to the new mobile client, the present method proceeds to step 1408.

At step 1406, provided the base station did, at step 1404, have sufficient capacity to provide one or more of a plurality of MD bitstreams to the new mobile client, the base station provides one or more of the available plurality of MD bitstreams to the new mobile client.

At step 1408, provided the base station did not, at step 1404, have sufficient capacity to provide one or more of a plurality of MD bitstreams to the new mobile client, the present method determines if an existing client is presently receiving more than one of a plurality of MD bitstreams. If an existing client is not presently receiving more than one of a plurality of MD bitstreams, the present embodiment returns to the beginning of the present method. If an existing client is presently receiving more than one of a plurality of MD bitstreams, the present embodiment proceeds to step 1410.

At step 1410, the present method allocates at least one of the existing client's plurality of MD bitstreams to the new mobile client.

In summary, the methods of the present embodiments provide improved utilization of wireless bandwidth during soft-handoffs, and reduced probability of service disruption during hard-handoffs.

Thus, the present invention provides a method and system for streaming media to fixed clients and/or mobile clients. The present invention further provides a method and system for streaming media to fixed clients and/or mobile clients wherein the method and system provides increased reliability and efficiency over conventional systems.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

The invention claimed is:

1. A method for performing a soft-handoff in a mobile streaming media system, said method comprising:
    a) detecting that a channel quality between a mobile client and a first base station remains above a drop threshold and that a channel quality between said mobile client and a second base station increases from below to above and add threshold; and
    b) sending a first multiple description bitstream from said first base station to said mobile client and sending a second multiple description bitstream from said second base station to said mobile client.

2. The method as recited in claim 1, further comprising:
    prior to a) said sending said first multiple description bitstream and said second multiple description bitstream from said first base station to said mobile client such that said mobile client receives said first multiple description bitstream and said second multiple description bitstream from said first base station.

3. The method as recited in claim 2, wherein a) further comprises:
    i) ceasing sending said second multiple description bitstream from said first base station to said mobile client.

4. The method as recited in claim 1, further comprising:
    c) detecting that said channel quality from said first base station to said mobile client drops below a drop threshold value; and
    d) dropping said channel between said first base station and said mobile client such that said mobile client does not receive said first multiple description bitstream from said first base station.

5. The method as recited in claim 1, further comprising:

e) upon dropping said channel between said first base station and said mobile client, sending said first multiple description bitstream from said second base station to said mobile client such that said mobile client receives said first multiple description bitstream and said second multiple description bitstream from said second base station.

6. A computer readable medium having computer readable code stored thereon for causing a network device to perform a soft-handoff in a mobile streaming media system, said method comprising:

a) detecting that a channel quality between a mobile client and a first base station remains above a drop threshold and that a channel quality between said mobile client and a second base station increases from below to above an add threshold; and b) sending a first multiple description bitstream from said first base station to said mobile client and sending a second multiple description bitstream from said second base station to said mobile client.

7. The computer readable medium of claim 6 wherein said computer readable medium further includes computer readable code stored thereon for causing said network device to perform:

prior to a) said sending said first multiple description bitstream and said second multiple description bitstream from said first base station to said mobile client such that said mobile client receives said first multiple description bitstream and said second multiple description bitstream from said first base station.

8. The computer readable medium of claim 7 wherein said computer readable medium further includes computer readable code stored thereon for causing said network device performing a) to further perform:

i) ceasing sending said second multiple description bitstream from said first base station to said mobile client.

9. The computer readable medium of claim 6 wherein said computer readable medium further includes computer readable code stored thereon for causing said network device to perform:

c) detecting that said channel quality from said first base station to said mobile client drops below a drop threshold value; and d) dropping said channel between said first base station and said mobile client such that said mobile client does not receive said first multiple description bitstream from said first base station.

10. The computer readable medium of claim 6 wherein said computer readable medium further includes computer readable code stored thereon for causing said network device to perform:

e) upon dropping said channel between said first base station and said mobile client, sending said first multiple description bitstream from said second base station to said mobile client such that said mobile client receives said first multiple description bitstream and said second multiple description bitstream from said second base station.

* * * * *

UNITED STATES PATENT AND TRADEMARK OFFICE
CERTIFICATE OF CORRECTION

PATENT NO. : 7,200,402 B2  
APPLICATION NO. : 09/898572  
DATED : April 3, 2007  
INVENTOR(S) : John G. Apostolopoulos et al.

It is certified that error appears in the above-identified patent and that said Letters Patent is hereby corrected as shown below:

In column 15, lines 52-53, after "servers" delete "(5)" and insert -- (S) --, therefor.

Signed and Sealed this

Twenty-fourth Day of November, 2009

David J. Kappos  
*Director of the United States Patent and Trademark Office*